US012806853B2

(12) United States Patent
Pan et al.

(10) Patent No.: US 12,806,853 B2
(45) Date of Patent: Nov. 24, 2026

(54) NANOSCALE SINGLE PHOTON THREE-DIMENSIONAL PRINTING SYSTEMS AND METHODS

(71) Applicant: Purdue Research Foundation, West Lafayette, IN (US)

(72) Inventors: Liang Pan, West Lafayette, IN (US); Xianfan Xu, West Lafayette, IN (US); Bryan W. Boudouris, Tuscaloosa, AL (US)

(73) Assignee: PURDUE RESEARCH FOUNDATION, West Lafayette, IN (US)

( * ) Notice: Subject to any disclaimer, the term of this patent is extended or adjusted under 35 U.S.C. 154(b) by 204 days.

(21) Appl. No.: 18/818,417

(22) Filed: Aug. 28, 2024

(65) Prior Publication Data

US 2025/0073989 A1 Mar. 6, 2025

Related U.S. Application Data

(60) Provisional application No. 63/535,195, filed on Aug. 29, 2023.

(51) Int. Cl.

| | |
|---|---|
| ***B29C 64/129*** | (2017.01) |
| ***B29C 64/268*** | (2017.01) |
| ***B29C 64/277*** | (2017.01) |
| ***B33Y 10/00*** | (2015.01) |
| ***B33Y 30/00*** | (2015.01) |
| ***B82Y 40/00*** | (2011.01) |

(52) U.S. Cl.
CPC .......... *B29C 64/129* (2017.08); *B29C 64/268* (2017.08); *B29C 64/277* (2017.08); *B33Y 10/00* (2014.12); *B33Y 30/00* (2014.12); *B82Y 40/00* (2013.01)

(58) Field of Classification Search
CPC .... B29C 64/129; B29C 64/277; B29C 64/268
See application file for complete search history.

(56) References Cited

U.S. PATENT DOCUMENTS

2024/0198583 A1* 6/2024 Arndt .................... B29C 64/264
2024/0408815 A1* 12/2024 Hahn ...................... G03F 7/029

FOREIGN PATENT DOCUMENTS

WO WO-2021067577 A1 * 4/2021 ............. B33Y 70/00

* cited by examiner

*Primary Examiner* — David E Smith
(74) *Attorney, Agent, or Firm* — Purdue Research Foundation

(57) ABSTRACT

A method of additive manufacturing includes directing a first photon beam onto a resin and directing a second photon beam onto the resin to generate a reactive species from the initiator molecule to thereby polymerize a portion of the resin. The resin includes an initiator molecule and a sensitizer molecule. The first photon beam simultaneously excites each of the initiator molecule and the sensitizer molecule, transitions each of the initiator molecule and the sensitizer molecule into their respective singlet excited states; and transfers, at least one of energy or electrons, from the singlet excited state of the sensitizer molecule to the initiator molecule.

20 Claims, 20 Drawing Sheets

NANOSCALE SINGLE PHOTON THREE-DIMENSIONAL PRINTING SYSTEMS AND METHODS

CROSS-REFERENCE TO RELATED APPLICATIONS

This application is related to and claims the priority benefit of U.S. Provisional Patent Application No. 63/535,195, entitled "Nanoscale Single Photon Three-Dimensional Printing Systems and Methods," filed Aug. 29, 2023, the contents of which are hereby incorporated by reference in their entirety into the present disclosure.

GOVERNMENT SUPPORT CLAUSE

This invention was made with government support under CMMI 2229143 awarded by the National Science Foundation. The government has certain rights in the invention.

TECHNICAL FIELD

The present application relates to additive manufacturing, and more particularly to single-photon based nanolithography systems and methods of forming three-dimensional nanoscale objects.

BACKGROUND

This section introduces aspects that may help facilitate a better understanding of the disclosure. Accordingly, these statements are to be read in this light and are not to be understood as admissions about what is or is not prior art.

Three-dimensional (3D) printing is a technique often used for applications ranging from product visualization to forming 3D engineering components. Regarding 3D nanostructures, not only are the small dimensions useful for making miniaturized devices, but they are often designed to form material properties exceeding typical material properties or even properties which are traditionally not possible. For example, ultra-light and ultra-stiff materials having negative static compressibility (see, FIG. 1A), materials with zero or negative thermal expansion coefficients, microscale machines (e.g., micro-optical-systems, micro-pumps, or micro-robots) (see, FIG. 1B), micromechanical devices for drug delivery (see, FIG. 1C), or scaffolding for regenerative medicine and tissue engineering (see, FIG. 1D). Three-dimensional nanostructures can also be engineered to have a strong optical chirality, a negative index of refraction, perfect light-absorbing surfaces, or to include a wide range of photonic devices for extremely flexible controls of light in both phase and amplitude.

Optical 3D printing can create micro- and nano-scale 3D features within a light-sensitive resin bath. Projection micro-stereolithography (μSL) and its derivatives can print 3D objects one layer at a time or layer by layer continuously, therefore, having a relatively high printing throughput. Multi-photon lithography and its derivatives can reliably create sophisticated 3D nanostructures by using nonlinear excitation of photo-responsive materials to locally activate voxel-wise polymerization and areal printing. More recently, the reverse algorithm of CT imaging has been implemented to spatially control the dosage of illumination and create 3D parts using Ω-volumetric illuminations.

The most commonly used method for producing 3D nanostructures is femtosecond laser-based two-photon polymerization, which is capable of producing nanoscale feature resolution. However, the throughput of femtosecond laser two-photon polymerization and the existing 3D nano-printing processes are slow as they rely on point-by-point scanning processes, although progress is being made toward faster, layer-by-layer printing. Another major obstacle for 3D nano-printing is that it is extremely costly. Commercial 3D nano-printers are currently priced at over $500,000 per unit. The cost to print a sophisticated 3D nanostructure is therefore orders of magnitude more expensive than that of the same volume of gold. At present, 3D nano-printing is mostly limited to research institutions no known industry uses 3D nano-printing for mass production. The high process cost, low throughput, and limited resolution of current 3D nano-printers are significant obstacles for commercial use in manufacturing. As such, improved nanolithography systems and processes are needed for 3D printing of nanostructures.

SUMMARY

Aspects of this disclosure describe additive manufacturing systems and methods, for example, to produce three-dimensional nanostructures. In one example, a method can include various acts such as exciting a photoinitiator molecule from a photoinitiator ground state to an excited photoinitiator singlet state, transitioning the photoinitiator molecule from the photoinitiator singlet state to an excited photoinitiator triplet state, exciting a sensitizer molecule from a sensitizer ground state to an excited sensitizer singlet state, transitioning the sensitizer molecule from the sensitizer singlet state to an excited sensitizer triplet state, initiating a triplet-triplet energy transfer process to excite the photoinitiator molecule at the excited photoinitiator triplet state using energy from the sensitizer molecule at the excited sensitizer triplet state, and exciting the photoinitiator molecule to thereby generate a free radical configured to initiate polymerization.

In other aspects, the methods can include various acts such as directing a first photon beam onto a resin and directing a second photon beam onto the resin to generate a reactive species from the initiator molecule to thereby polymerize a portion of the resin. The resin can include an initiator molecule and a sensitizer molecule. The first photon beam can simultaneously excite each of the initiator molecule and the sensitizer molecule, transition each of the initiator molecule and the sensitizer molecule into their respective singlet excited states, and transfer, at least one of energy or electrons, from the singlet excited state of the sensitizer molecule to the initiator molecule.

In other aspects, a system for additive manufacturing can include a first digital micromirror element configured to direct an activation image beam through a projection lens, a second digital micromirror element configured to direct a patterning image beam through the projection lens, and a substrate including a first and second Fresnel zone plate lenses. The projection lens can be configured to simultaneously direct a parallel set of printing beams onto a resin to form an elevated three-dimensional object. Each printing beam of the parallel set of printing beams can include the activation image beam and the patterning image beam. In some embodiments, the substrate can be configured to laterally oscillate along a path perpendicular to a direction of elevation of the elevated three-dimensional object to form a repeated structural pattern of the elevated three-dimensional object.

This summary is provided to introduce a selection of the concepts that are described in further detail in the detailed description and drawings contained herein. This summary is not intended to identify any primary or essential features of the claimed subject matter. Some or all of the described features may be present in the corresponding independent or dependent claims, but should not be construed to be a limitation unless expressly recited in a particular claim. Each embodiment described herein does not necessarily address every object described herein, and each embodiment does not necessarily include each feature described. Other forms, embodiments, objects, advantages, benefits, features, and aspects of the present disclosure will become apparent to one of skill in the art from the detailed description and drawings contained herein. Moreover, the various apparatuses and methods described in this summary section, as well as elsewhere in this application, can be expressed as a large number of different combinations and subcombinations. All such useful, novel, and inventive combinations and subcombinations are contemplated herein, it being recognized that the explicit expression of each of these combinations is unnecessary.

BRIEF DESCRIPTION OF THE DRAWINGS

While the specification concludes with claims which particularly point out and distinctly claim this technology, it is believed this technology will be better understood from the following description of certain examples taken in conjunction with the accompanying drawings, in which like reference numerals identify the same elements and in which:

Figure 1B:
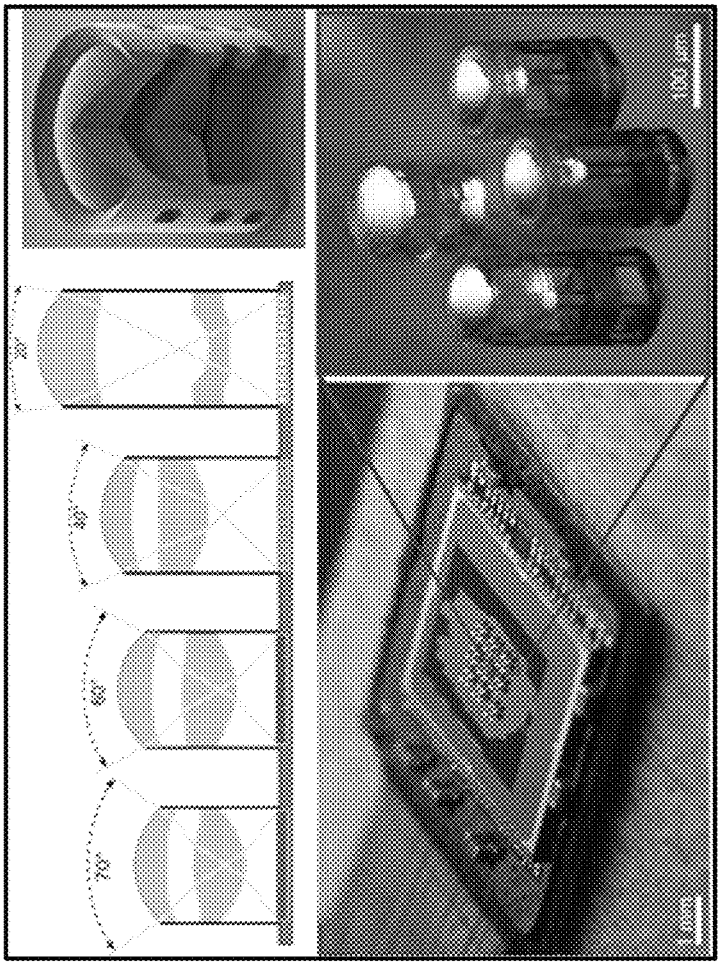
FIG. 1B depicts a second example of a 3D nanostructure, showing 3D printed compounded lenses with different focal lens, integrated on imaging chip.
Figure 1A:
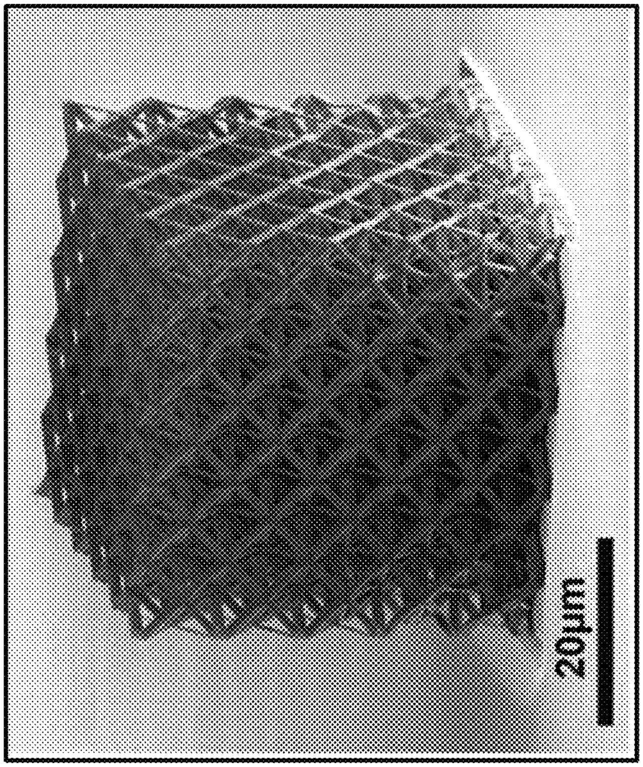
FIG. 1A depicts a first example of a 3D nanostructure, showing a 3D printed light and strong meta-material.
Figure 1D:
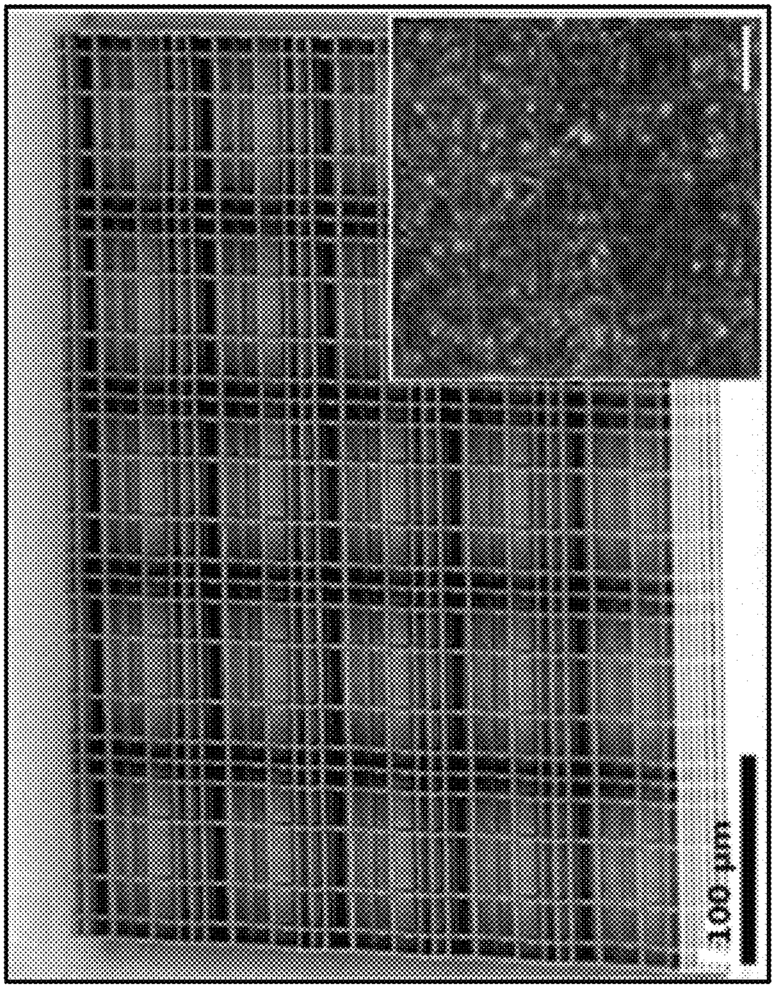
FIG. 1D depicts a fourth example of a 3D nanostructure, showing 3D printed scaffolds usable for regenerative medicine.
Figure 1C:
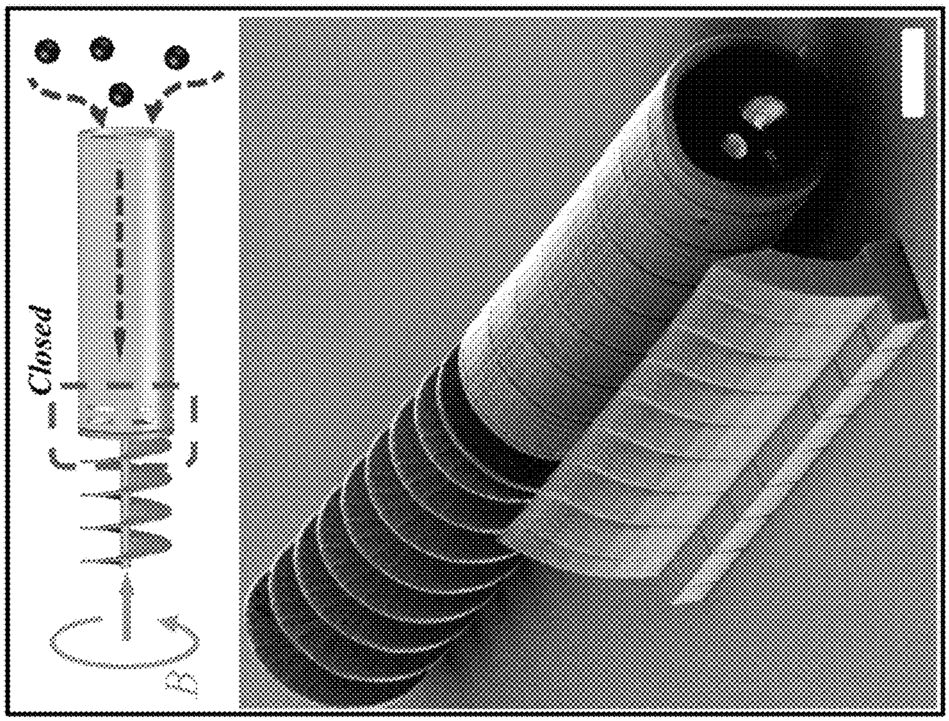
FIG. 1C depicts a third example of a 3D nanostructure, showing a 3D printed drug delivery system driven by magnetic field.

The drawings are not intended to be limiting in any way, and it is contemplated that various embodiments of the technology may be carried out in a variety of other ways, including those not necessarily depicted in the drawings. The accompanying drawings incorporated in and forming a part of the specification illustrate several aspects of the present technology, and together with the description serve to explain the principles of the technology; it being understood, however, that this technology is not limited to the precise arrangements shown, or the precise experimental arrangements used to arrive at the various graphical results shown in the drawings.

DETAILED DESCRIPTION

The following description of certain examples of the technology should not be used to limit its scope. Other examples, features, aspects, embodiments, and advantages of the technology will become apparent to those skilled in the art from the following description, which is by way of illustration, one of the best modes contemplated for carrying out the technology. As will be realized, the technology described herein is capable of other different and obvious aspects, all without departing from the technology. Accordingly, the drawings and descriptions should be regarded as illustrative in nature and not restrictive.

It is further understood that any one or more of the teachings, expressions, embodiments, examples, etc. described herein may be combined with any one or more of the other teachings, expressions, embodiments, examples, etc. that are described herein. The following-described teachings, expressions, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

I. Overview

Figure 2A:
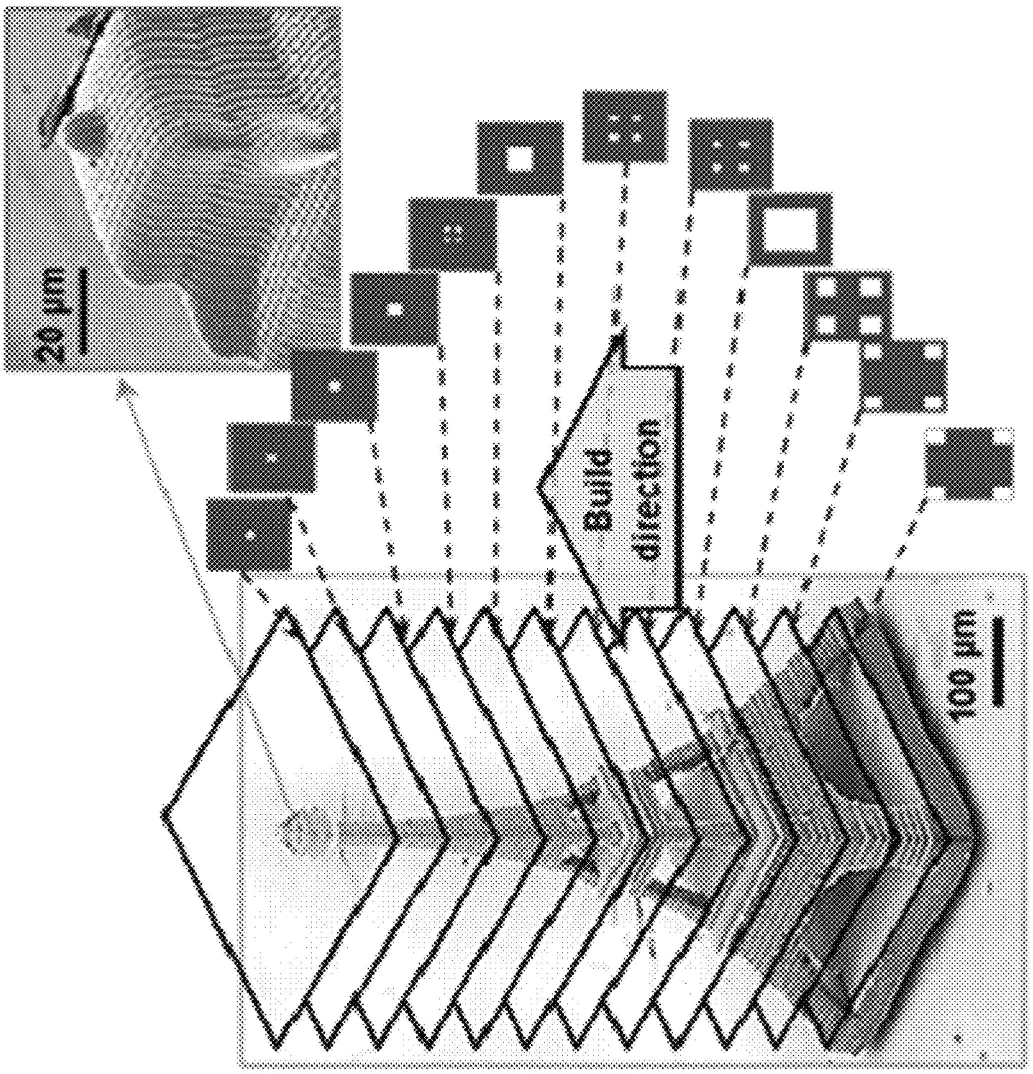
FIG. 2A depicts a first example of a projection-type micro-stereo-lithography (μSL), showing a 3D printed Eiffel Tower structure.
Figure 2B:
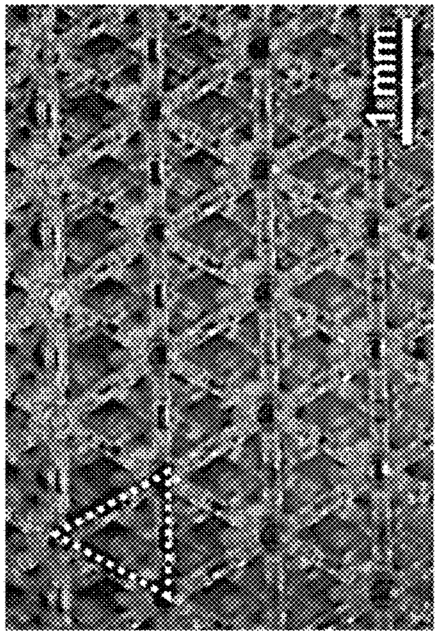
FIG. 2B depicts a first example of a projection-type micro-stereo-lithography (μSL), showing 3D printed zero-stiffness materials with a chiral symmetry.
Figure 2C:
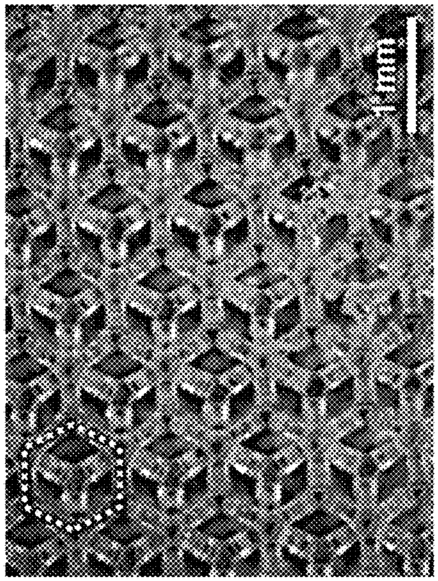
FIG. 2C depicts a first example of a projection-type micro-stereo-lithography (μSL), showing a 3D printed in-plane isotropic zero-stiffness material.
Figure 2D:
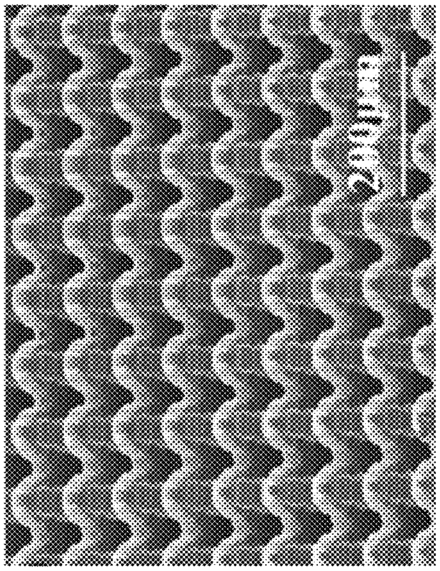
FIG. 2D depicts a first example of a projection-type micro-stereo-lithography (μSL), showing 3D printed artificial lattices.
Figure 2E:
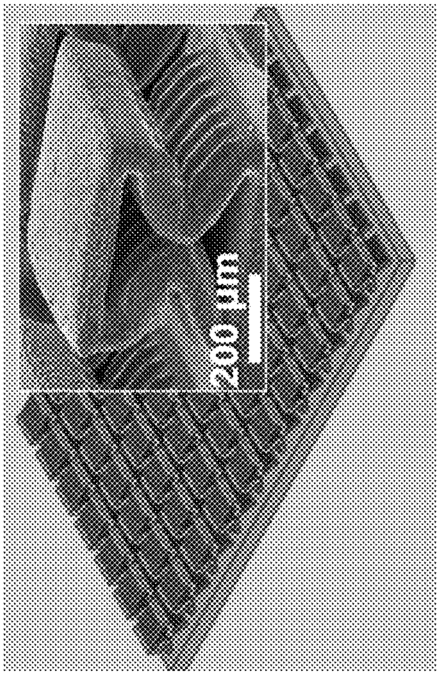
FIG. 2E depicts a first example of a projection-type micro-stereo-lithography (μSL), showing 3D printed dry thermal interface structures for ultra-low joining pressure.

Projection 3D printing uses mature image generation devices, such as the digital micromirror device (DMD), to parallelly and dynamically project millions of pixels to create complex 3D structures at high speed. This method can allow streaming of parallel data in real-time with precision positioning and timing controls. One such projection micro-stereolithography (SL) system can directly write 3D nano-structures inside a liquid bath of photocurable resin at a speed of up to 10 s layers per second. By changing the projection lens, the optical resolution can be adjusted in the range of 200 nm-100 μm. The μSL system uses a DMD to dynamically cast images to photo-define solid structures. 3D structures are fabricated by sequentially stacking a series of predefined 2D structures layer-by-layer. FIG. 2A shows a scanning electron microscope (SEM) image of a microscale Eiffel Tower structure fabricated using this μSL system. The design and fabrication of various 3D microstructures using this system are shown in FIGS. 2B-2E. For example, shown are zero-stiffness microstructures (FIGS. 2B-2C), photonics lattices (FIG. 2D), and thermal interface structures (FIG. 2E).

Figure 3A:
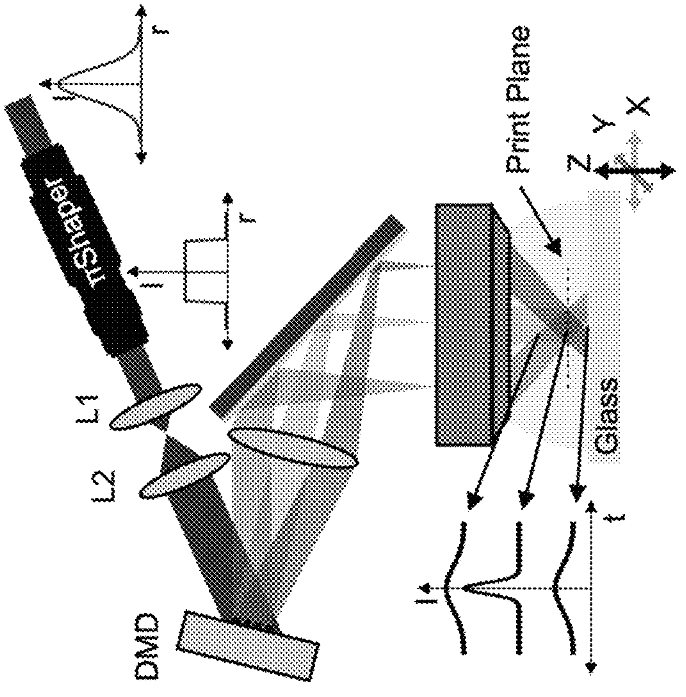
FIG. 3A depicts a schematic of one spatiotemporal printing system, showing a laser beam diffracted off of the DMD pattern to reform an image at the print plane inside a liquid resin.
Figure 3B:
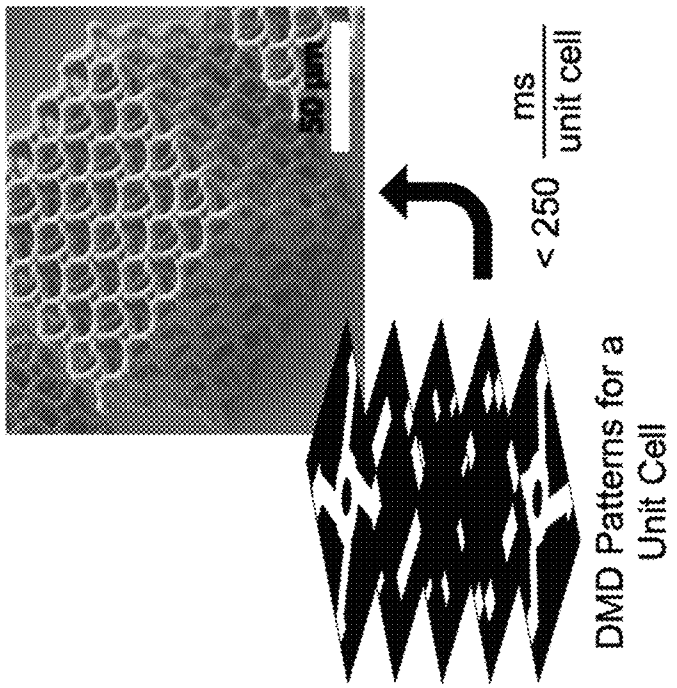
FIG. 3B depicts example DMD patterns displayed during 3D fabrication of a single 3D 5×5×3 unit structure.
Figure 3C:
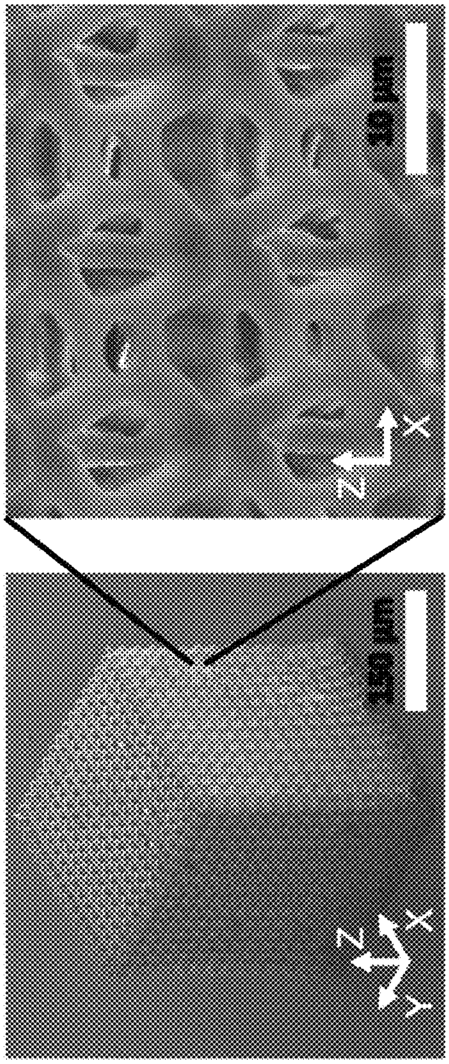
FIG. 3C depicts macroscale metamaterial-like structures with 15×15×15 unit cells.
Figure 3D:
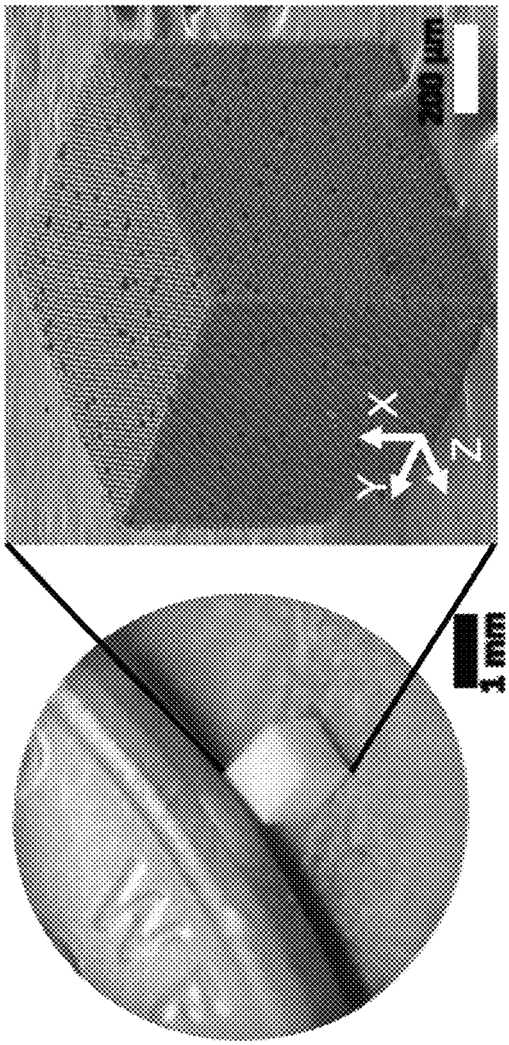
FIG. 3D depicts an optical image of a 42×42×42 unit-cell structure situated near the edge of a United States penny and its SEM picture.

Projection multi-photon printing has also been developed using an amplified femtosecond laser system for fabricating 3D structures in a rapid, layer-by-layer, and continuous manner, as depicted in FIGS. 3A-3B. Three-dimensional projection printing is achieved using spatiotemporal focusing, which confines the printing to thin layers within the resin. Complex 3D structures are fabricated, with millimeter-scale printing realized at a printing rate of above 10-3 mm3/s as shown in FIGS. 3C-3D. Since the process uses an amplified femtosecond laser system, the cost of building a manufacturing tool is high.

Efforts have also been made to develop a single-photon process that can work with low-cost continuous-wave lasers, therefore providing a low-cost tool to print 3D nanostructures. By allowing dissolved oxygen to refill around an excited writing voxel, 3D nanostructures can be written using a continuous-wave laser at a writing speed up to 10 μm/s. In some applications, photo-induced radicals are used produce the inhibition effect near the voxel to create 3D structures. Furthermore, single-photon-based photothermal initiations can also be demonstrated to locally activate polymerization at the voxels. However, these single-photon nonlinear printing processes still require lasers with high peak powers or writing at low speeds. Despite their lower laser cost, they still don't have a significant throughput advantage over the femtosecond laser-based lithography, therefore, making them unsuitable for mass production.

Despite the significant tool cost reduction enabled by other single-photon nonlinear processes, the overall printing resolution of other methods is still limited by optical diffraction to the wavelength scale around 100 nm, and the demonstrated throughput still needs to be drastically improved for large scale manufacturing. Described herein are improved systems and methods for single-photon 3D nanolithography at a high scanning speed. Particularly, the systems and methods utilize an initiation-depletion-based mechanism to achieve the nonlinear polymerization.

To address the high cost and low throughput of current 3D nano-printing, the improved systems and methods described herein can transform laser-based 3D additive nano-printing technologies by direct-writing sophisticated 3D nanostructures at a 1000-times higher throughput (which provides a 1000-times lower process cost) and a higher patterning resolution at 50 nm or better.

II. Exemplary Single-Photon, Nonlinear 3D Nano-Printing Systems and Methods

Described in greater detail below is a high-resolution, low-cost, high-throughput 3D nano-printing system and method configured to overcome the high process cost and low throughput of existing 3D nano-printing systems. The described systems provide the manufacturing capability to create 3D structures with the required resolution and throughput, therefore enabling the manufacturing of 3D nanostructures at scale. In the following sections, single-photon nano-printing mechanisms and single-photon printing methods are described, in addition to a projection-type parallel nano-printing system operable to obtain three orders of magnitude higher throughput, and then a digital-twin database is described.

A. Exemplary Mechanisms of Single-Photon-Based Nonlinear 3D Nanopatterning

Figure 4:
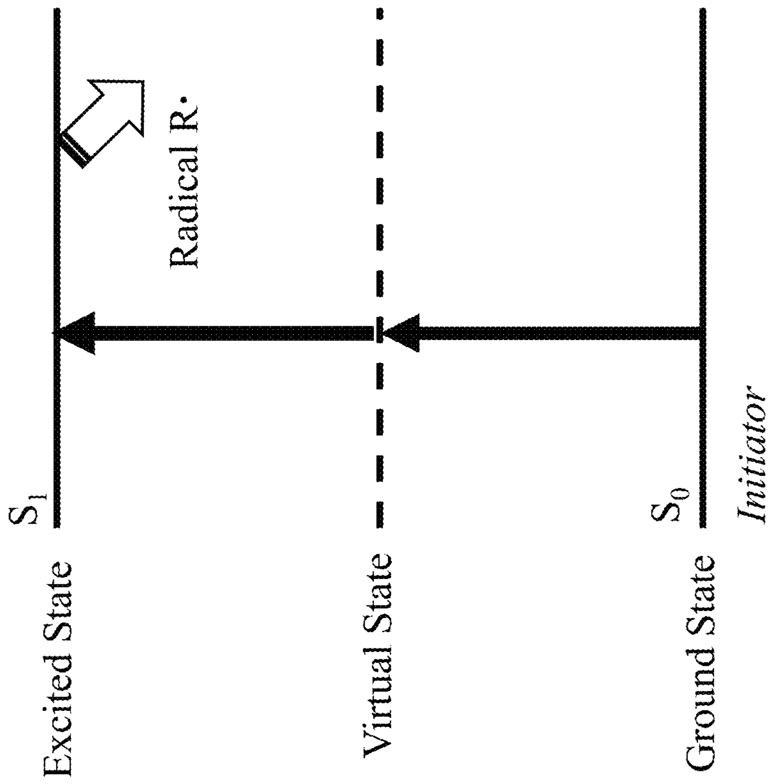
FIG. 4 depicts a schematic of a simplified energy level model for two-photon lithography.

Femtosecond-laser 3D writing uses two-photon absorption (TPA) to achieve a second-order process with respect to light intensity. In TPA, a single photon does not have the sufficient energy to excite an initiator molecule from its ground state to the excited electronic state, therefore, bridging this energy gap requires simultaneous absorption of two photons with a probability proportional to the square of the light intensity. In the simplified energy-level model, shown in FIG. 4, the TPA can be understood as a "dynamic" process, where a short-lived "virtual" state is first created by the interaction between the first photon and the molecule, and the second photon further excites the molecule to an electronic state that physically exists. As the result, the absorption cross section of TPA is typically several orders of magnitude smaller than that of the single-photon absorption therefore femtosecond lasers are required to have efficient TPA processes. During a femtosecond-laser two-photon printing process, TPA only occurs at the laser focus to generate and accumulate photopolymers, known as the writing voxel. At the locations away from the writing voxel, no photopolymer accumulation can occur. Achieving such nonlinear responses is important to enabling 3D nano-printing.

Figure 5A:
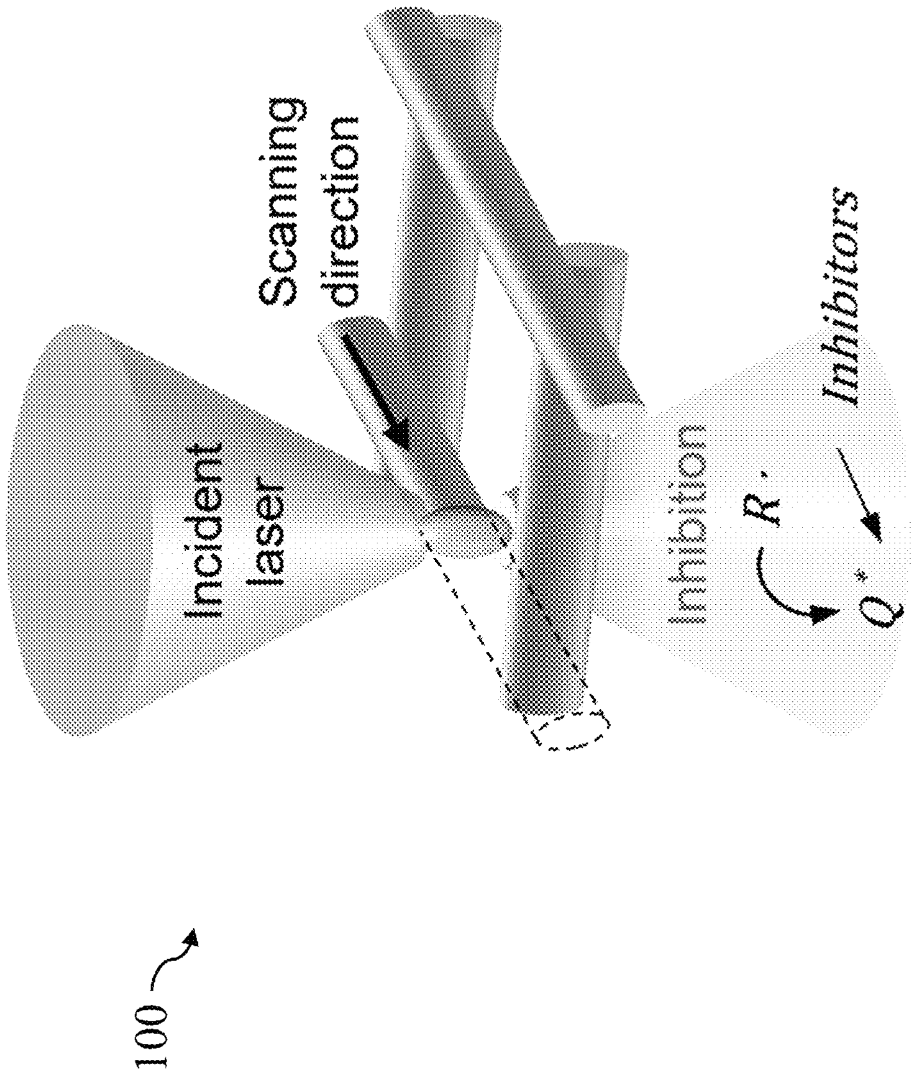
FIG. 5A depicts a schematic of a high-speed single-photon nonlinear 3D printing system, showing competing photo-chemical and diffusion processes.

Described herein is an advantageous non-linear mechanism, as shown in FIG. 5A, operable to achieve nanoscale 3D printing at low laser intensities without the need for femtosecond lasers. The system (100) makes use of a single-photon-based dosage-nonlinearity to fabricate 3D nanostructures, demonstrating a cost-effective method for 3D nanolithography using a low-cost laser. In some embodiments, such as those described herein, a 405-nm continuous-wave diode laser is utilized to allow for continuous printing. However, other light sources may be utilized instead. This dosage-nonlinearity is achieved by using controlled depletion of photoinitiation species in an environment containing inhibiting species. By controlling multiple competing processes, the undesired dose accumulation outside the writing voxel is stopped, and thereby this method creates a confined writing voxel in the 3D space. This printing method is demonstrated at a 120 nm resolution using a low-cost diode laser using a single-photon process.

The diffusion-governed depletion of photo-initiating species is the result of multiple competing processes during photopolymerization. These processes are radical formation by photons that leads to polymerization, diffusion of inhibiting radicals that prevents polymerization such that the printed volume can be reduced to achieve high printing resolution, and depletion of inhibiting radicals at the location where printing is needed by proper laser power control. This highly nonlinear 3D single-photon printing requires proper polymer chemistry. The resin components are carefully designed based on the photopolymerization mechanism. In a typical process, the initiator absorbs photons to generate initiating radicals (R·). These radicals then react with the large sea of monomers that compose the resin and create the first repeat unit of the polymer chain growth reaction to increase the molecular weight and form the macromolecular species, i.e., the final printed product. Typically, the monomer conversion is determined by the accumulative number of photons absorbed, which yields a linear process. In the improved method the linearity is broken by introducing additional depletion and diffusion effects. A highly nonlinear response arises when the initiators are at an engineered strength similar to that of the inhibitors.

Various combinations of resin components may be used based on the photopolymerization mechanism. In one example, a resin formula may include: 95 wt % trimethylolpropane triacrylate (TMPTA) or pentaerythritol triacrylate (PETA) and 5 wt % of triethylene glycol dimethacrylate (TEGDMA), 80 ppm Phenylbis(2,4,6-trimethylbenzoyl) phosphine oxide (BAPO), 0.3 wt % of 4-methoxyphenol (MEHQ), 0.1 wt % of 1-(phenyldiazenyl) naphthalen-2-ol (Sudan I). In another example, a resin formula may include 0.6 wt % benzil and 2.1 wt % BTPOS and in 97.2 wt % PETA.

Temporal modulation of laser light was further used to actively regulate the polymerization rate at the nanoscale. Each modulation cycle allows three phases of processes to occur. In phase I, the laser pulse starts and generates radical species to overcome local inhibition, but without initiating polymerization. In phase II, the local inhibitors are depleted and the initiating radicals start the local polymerization. After the feature is written, in phase III, the laser is off, allowing inhibitors to diffuse into the printing volume before the next cycle starts. Considering the inhibitor diffusivity ($m^2/s$) and the targeted voxel size, we may pulse the laser from 10 s-100 s kHz repetition rates and at 2-5% of duty cycles. These settings allowed for accurate control of inhibition-depletion.

Figure 5B:
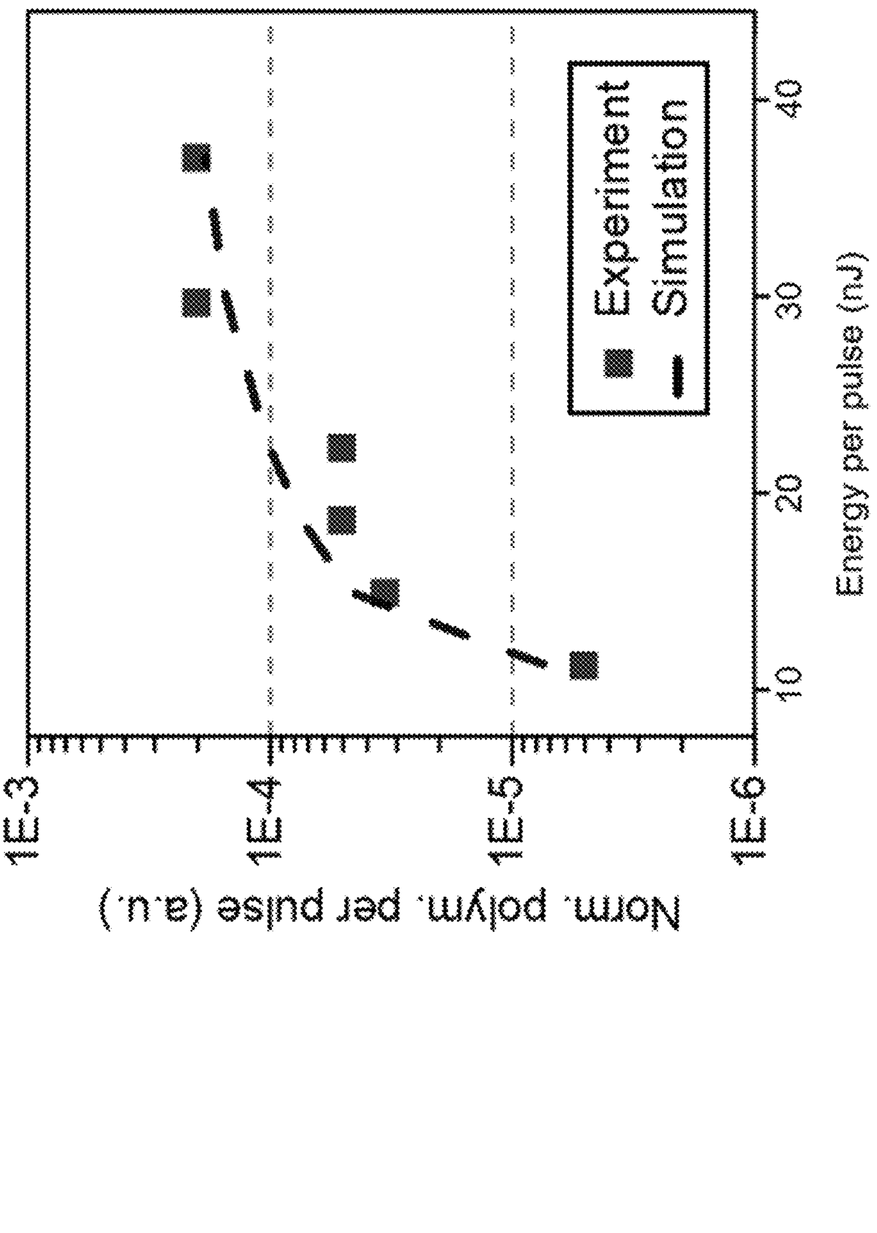
FIG. 5B depicts a graphical representation of a high-speed single-photon nonlinear 3D printing system, showing the minimum pulse energy required for polymerization in one simulation.

The order of nonlinearity in printing, $\gamma$, is characterized using the relationship between the effective exposure dose rate (the polymerization amount per second) and the laser intensity. Hence, the value of $\gamma$ may be quantified by measuring the required number of laser pulses to write the same structure at different pulse energy. FIG. 5B shows, at the condition at around 20-40 nJ/pulse, the polymerization rate increases by about 10 times over a 2× increase of pulse energy. The same trend of rapid change in polymerization amount is also confirmed in our simulation. This response corresponds to a $\gamma$ value significantly higher than that of the femtosecond laser two-photon process ($\gamma$=2). This comes from the aforementioned competing effect, where a mild increase of laser power near the threshold can significantly enhance the polymerization. As the laser pulse energy increases, the $\gamma$ value gradually reduces but remains higher than two within the operation window of the chosen laser power range. It is worth noting that the induced polymerization for pulse energy lower than 10 nJ drops to near zero, meaning that no patterns can be found at this pulse energy even for an unpractically high number of pulses. Simulations indicate that, for weak pulses, the generated photo-radical are quickly consumed by the inhibiting species and eventually the initiators are depleted after a number of pulses. A long-term memory effect was not observed from this local initiation-depletion because of multiple helpful mechanisms including the inbound diffusion of initiator molecules, outbound diffusion of oligomers, convections, and inflow of the fresh resin.

Figure 5C:
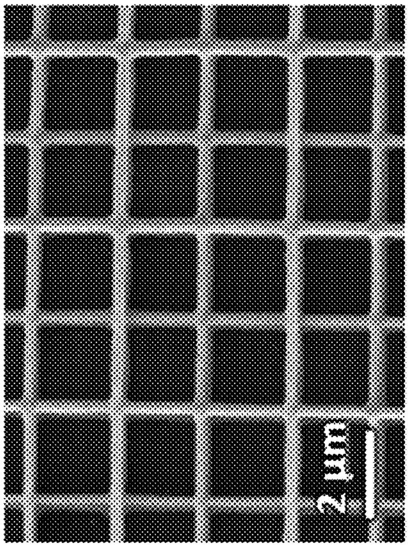
FIG. 5C depicts an output image taken from a high-speed single-photon nonlinear 3D printing experiment, showing a printed fishnet grid.
Figure 5D:
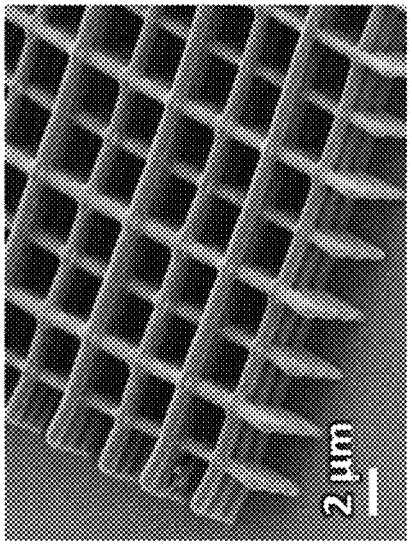
FIG. 5D depicts an output image taken from a high-speed single-photon nonlinear 3D printing experiment, showing a printed woodpile structure.
Figure 5E:
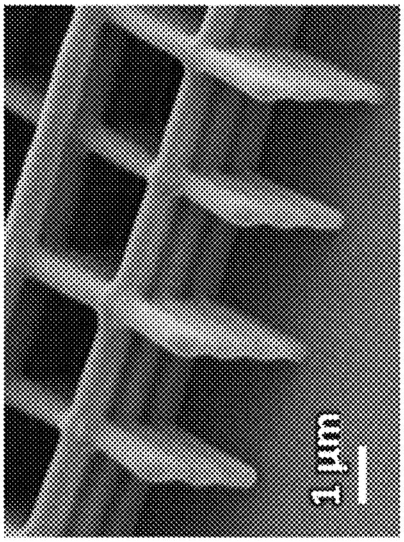
FIG. 5E depicts an enlarged view of the printed woodpile structure of FIG. 5D.
Figure 5F:
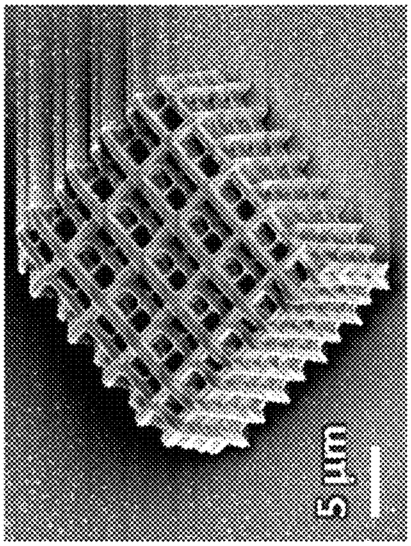
FIG. 5F depicts an output image taken from a high-speed single-photon nonlinear 3D printing experiment, showing a printed tall woodpile structure.
Figure 5G:
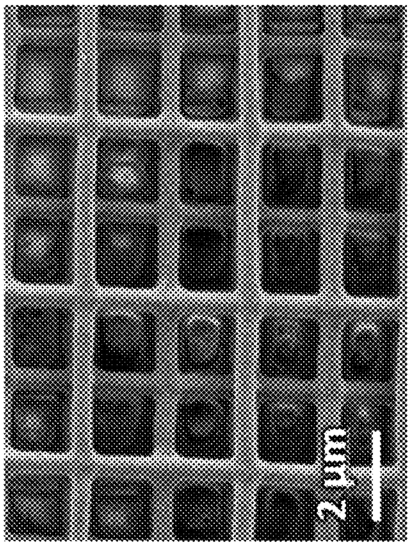
FIG. 5G depicts an enlarged top view of the printed tall woodpile structure of FIG. 5F.
Figure 5H:
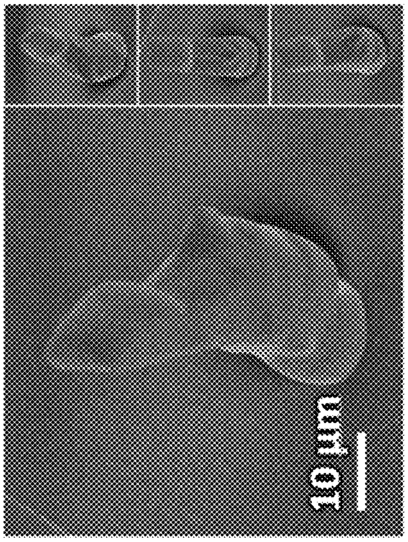
FIG. 5H depicts an output image taken from a high-speed single-photon nonlinear 3D printing experiment, showing a printed Moai statue.

FIG. 5C shows a single-layer fishnet structure by focusing the laser through a resin layer of 160-μm thick. FIGS. 5C-5F show 3D woodpile structures. The multiple individual layers can be observed with layer separation. The demonstrated feature sizes of the printed structure match the shape of the optical focus used in the experiments. FIG. 5H shows a Moai statue from different viewing directions. By operating near the writing threshold, nanoscale solid structures can be written consistently under dynamic inhibition control. The best-demonstrated feature size is about 120-nm using a laser power close to the writing threshold, which implies the possibility of printing sub-diffraction-limit features by trimming the voxel with engineered inhibition or selective activations.

Figure 6A:
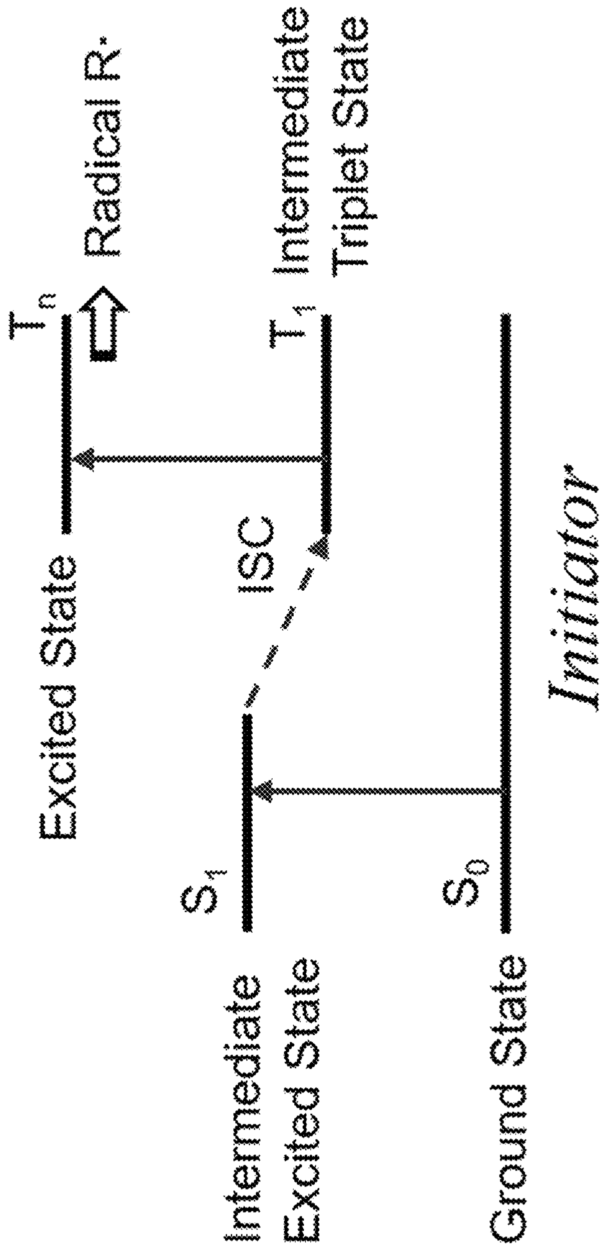
FIG. 6A depicts a schematic of a two-step absorption (TSA) based high-speed single-photon nonlinear nanolithography process, showing a simplified energy-level model for the TSA process which includes an intersystem crossing (ISC) process.

Additional nonlinearity can be enhanced by using single-photon-based nonlinear absorption processes of the photo-initiator. The newly discovered printing process is based on the TSA mechanism. Compared to TPA, the two-step absorption process shows the same second order optical nonlinearity for photo-radical generation; however, it only requires a low light intensity that is more than 106 times lower than that of the typical multi-photon absorptions. An important aspect is to engineer the effective lifetime of the intermediate state during the excitation process. Unlike the TPA process, which has a short-lived 'virtual' state, the intermediate states for the TSA are physical molecular states that have far longer lifetimes, as shown in FIG. 6A. These states are usually excited triplet states that can last for 106-108 times longer than that of the "virtual" states in TPA, therefore, the TSA process allows weak light to further excite the intermediate state before the molecule relaxes back to its ground state.

Figure 6B:
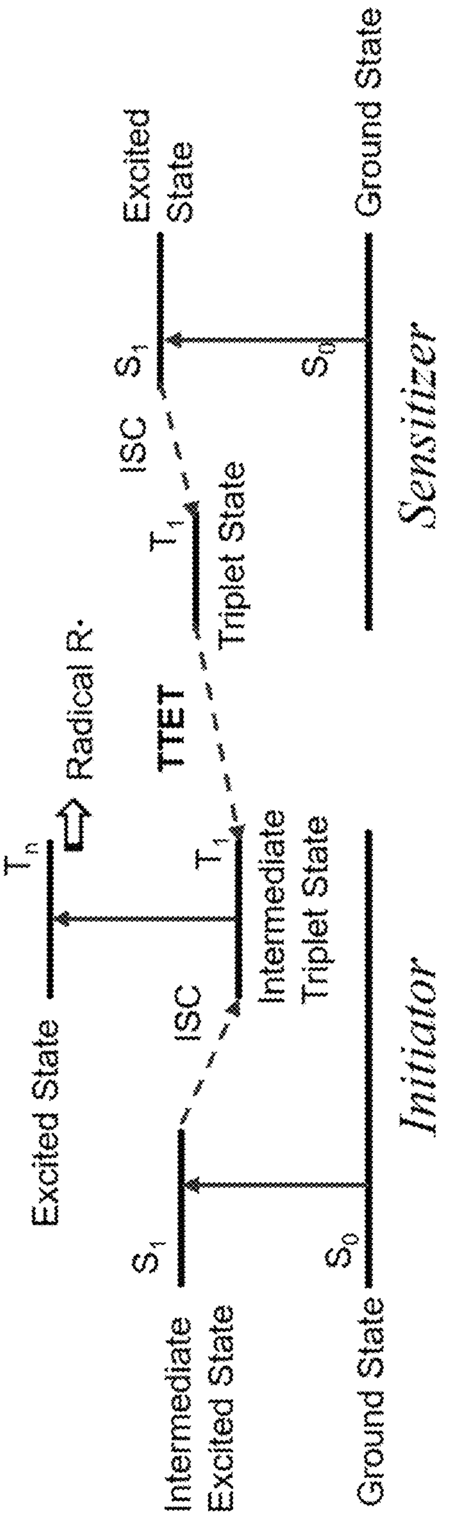
FIG. 6B depicts a schematic of an improved TSA based high-speed single-photon nonlinear nanolithography process, showing the sensitized TSA process by the triplet-triplet energy transfer (TTET) process.
Figure 6C:
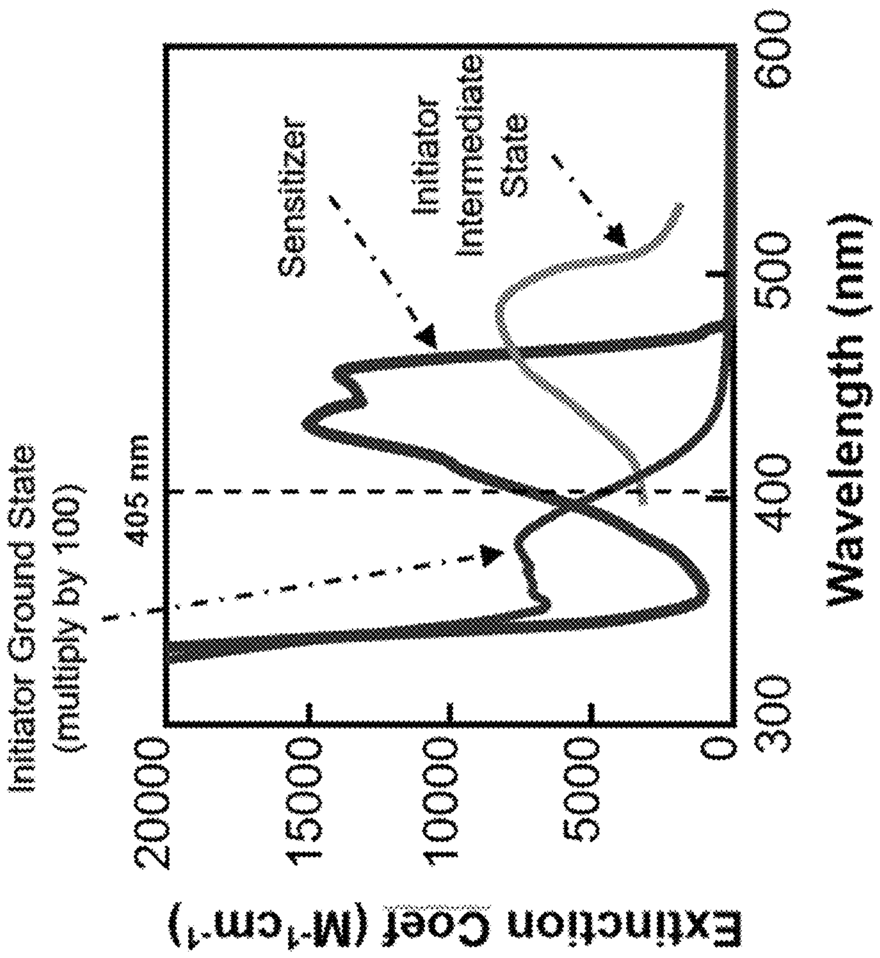
FIG. 6C depicts a graphical representation of an improved TSA based high-speed single-photon nonlinear nanolithography process, showing excitation spectra of an initiator in ground-state, a triplet state, and the sensitizer.
Figure 6D:
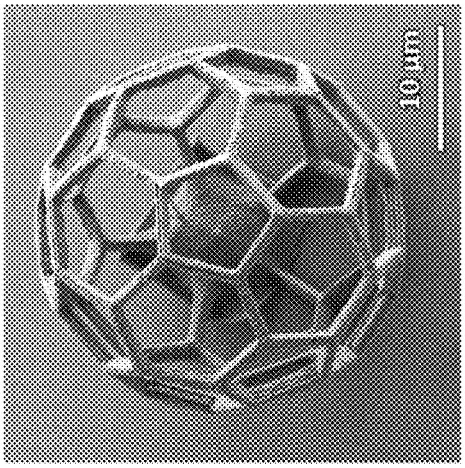
FIG. 6D depicts an output image taken from the improved TSA based high-speed single-photon nonlinear nanolithography process, showing an SEM image of a microscale soccer ball.
Figure 6E:
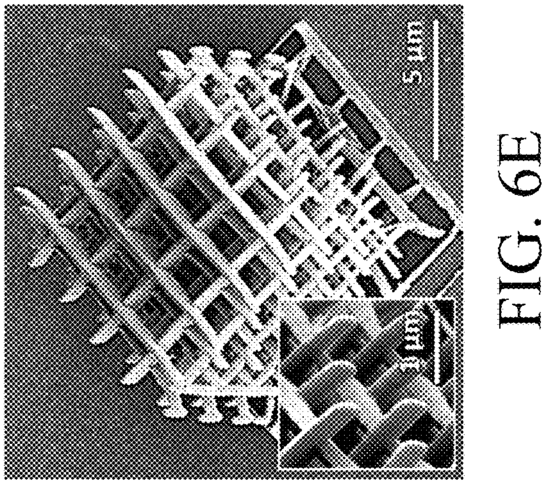
FIG. 6E depicts an output image taken from the improved TSA based high-speed single-photon nonlinear nanolithography process, showing an SEM image of a woodpile structure formed of 100-nm wide 500-nm tall lines.
Figure 6F:
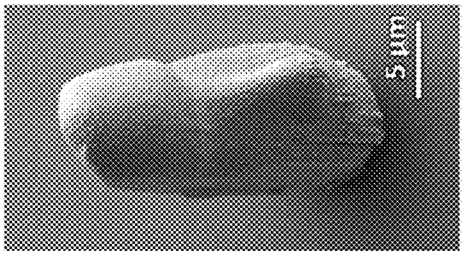
FIG. 6F depicts an output image taken from the improved TSA based high-speed single-photon nonlinear nanolithography process, showing an SEM image of a Moai statue.
Figure 6G:
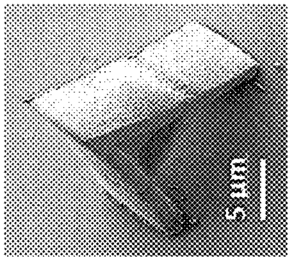
FIG. 6G depicts an output image taken from the improved TSA based high-speed single-photon nonlinear nanolithography process, showing an SEM image of a letter "A;"
Figure 6H:
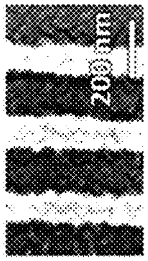
FIG. 6H depicts an output image taken from the improved TSA based high-speed single-photon nonlinear nanolithography process, showing an SEM image of 100-nm wide lines at a 220-nm pitch.

Based on the TSA method, the process can be improved by adding a strong absorption mechanism to further enhance the printing performance, as shown in FIG. 6B. The energy efficiency of the TSA photo-initiator is directly affected by the combination of coefficients of the two absorption steps, i.e., from the ground state to the intermediate state, and then to the fully excited state. The absorption coefficient of the first step for the current TSA photo-initiator is about 100 times lower than that of the second step, as shown in FIG. 6C. A strong absorption agent was used, known as a "sensitizer," that can efficiently absorb more laser light by over two orders of magnitude than the initiator molecule alone. The excited sensitizers may undergo the intersystem crossing (ISC) process and turn to their triplet states. The sensitizers at their triplet state can then excite the TSA photo-initiator through a triplet-triplet energy transfer process (TTET), which is more efficient than the direct photo-excitation of the initiator molecules, as shown in FIG. 6C. By using this sensitized TSA scheme with diacetyl as the sensitizer, the 3D nano-printing is demonstrated at 10 μW of average optical power (over 3 times lower) from a pen-sized 405-nm diode laser. Similar to that of the multiphoton lithography, the demonstrated linewidth can be controlled by selecting the corresponding laser power levels and scanning speed, where the minimum feature size is about 100 nm and the fastest scanning speed is about 4000 μm/s. FIG. 6D shows the SEM photo of a microscale soccer ball. FIG. 6E shows a woodpile structure of 100-nm wide and 500-nm tall lines. FIGS. 6F-6G show statues of a Moai and a letter "A." FIG. 6H shows a portion of printed lines of 100-nm in width and 220-nm in pitch.

The temporal modulation of the laser source was also tested to further enhance the writing sensitivity. The demonstrated equivalent area dosage required can be as low as about 2 $J/mm^3$ in 3D (or 100 $mJ/cm^2$ in 2D) for typical printing processes in which about 50% of the space are patterned at nanoscale resolutions. This sensitized TSA scheme may further reduce its writing threshold by at least one order of magnitude simply by choosing a proper combination of sensitizer and working wavelength, reaching the scale of 10-100 $mJ/mm^3$. For example, by working with the current sensitizer shown in FIG. 6C, shifting the diode laser wavelength to 450 nm can have about five times better writing threshold (over two times better sensitizer absorptions, and approximately three times better initiator's intermediate state absorption, assuming the quantum yield of ISC by 450 nm photon excitation is same as that of the 405 nm photon, which is commonly true). The sensitized TSA writing threshold could be potentially reduced to 1 μW or lower, by choosing the optimized type and concentration of sensitizers and laser wavelength, therefore allowing consumer-level spatial modulators (such as DMDs) to be used without noticeable long-term degradations to perform large-scale projection printing.

B. Exemplary Methods of High Resolution, High Throughput, Low-Cost Single-Photon 3D Printing To accelerate the printing throughput by orders of magnitudes higher than that of state-of-the-art, three integrated methods with increasing complexity and throughput are described below.

i. Single-Photon 3D Nano-Printing Using Parallel Scanning

Figure 7:
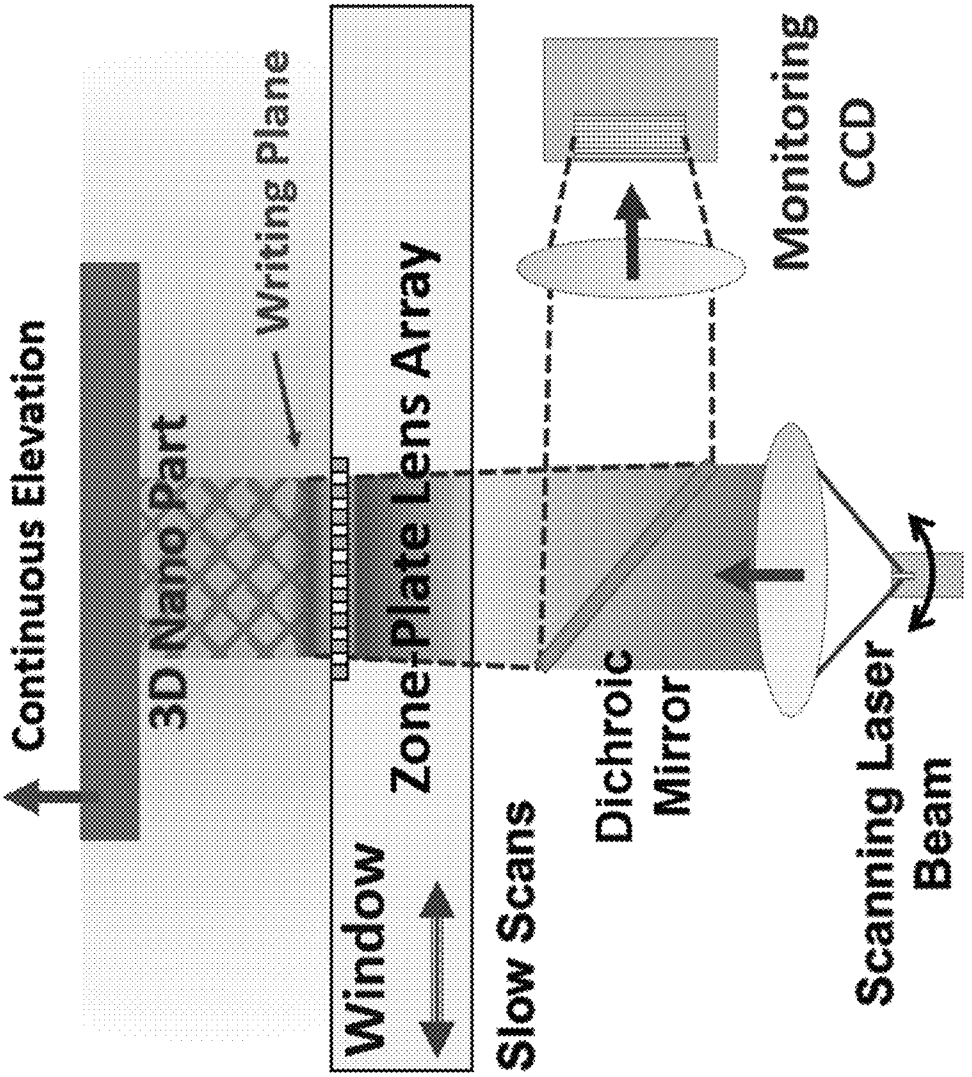
FIG. 7 depicts a schematic of one exemplary parallel 3D nano-printing system.

The single-photon approach only requires a low power that a micro-lens can deliver. An array of micro-lenses may be used to enhance the 3D nano-printing throughput by several orders of magnitude at the demonstrated writing speeds. A great candidate is the Fresnel zone-plate lens, which can be designed as a solid immersion lens of 200-300 μm size with a near-ideal NA and made on a flat surface into a large array. Schematics of the first proposed 3D nano-printing method are shown in FIG. 7. An ultraviolet (laser) beam may be used for 3D printing in a liquid resin. The beam can be modulated by a dynamic pattern generator and then projected onto an array of Fresnel zone plate lenses fabricated on a transparent window (only one zone plate is shown in FIG. 7, though more may be utilized). Since the size of the optimal projection field of the individual Fresnel zone plate lens is smaller than that of the lens, the window carrying the lens array will move at a small distance during the printing process to cover the whole area. By pulling the fabricated part away from the printing zone and synchronizing this motion with the projected initiation light beam patterns, continuous printing of 3D nanostructures will be realized.

The proposed 3D nano-printer can be built on the frame of an inverted microscope that is currently used for single-photon 3D nano-printing (see, FIG. 5), with additions of lasers and optical and optomechanical components. 405 nm diode laser sources can be used, which are low-cost and high power, to demonstrate a low-cost 3D parallel nano-printing system.

Figure 8A:
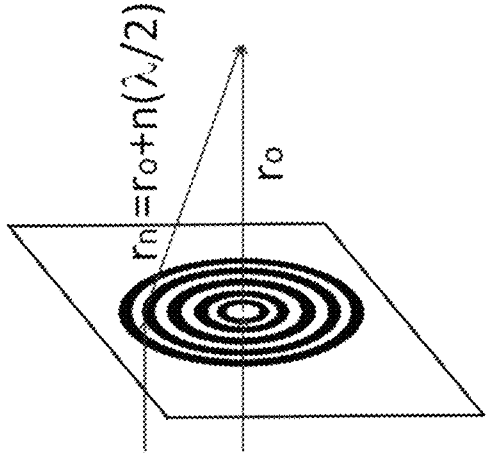
FIG. 8A depicts a schematic of a Fresnel's zone plate.
Figure 8B:
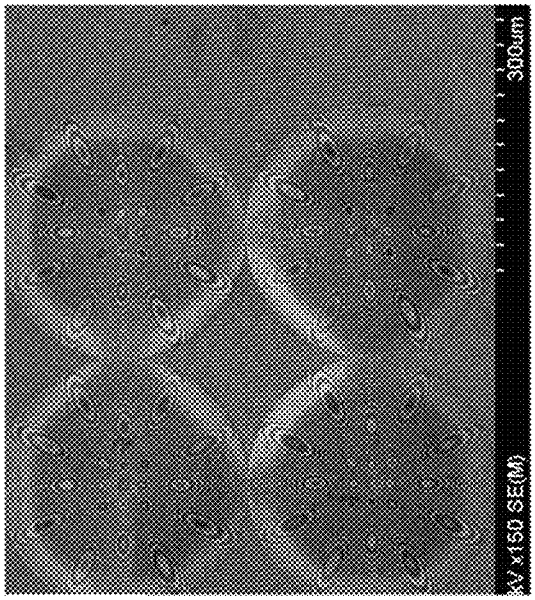
FIG. 8B depicts an output SEM image of four zone plate lenses fabricated by a microfabrication method, showing a scale bar of 300 μm.
Figure 8C:
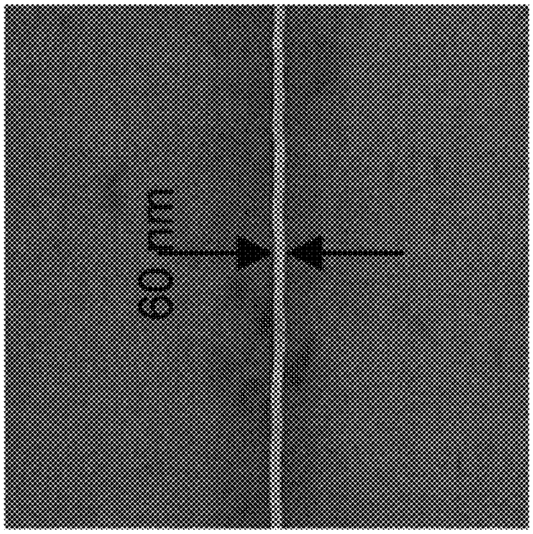
FIG. 8C depicts an output SEM image of a 60 nm silicon nanowire grown by a light-induced CVD process, with a zone plate being used to produce a focused light spot, showing a scale bar of 1 μm.
Figure 8D:
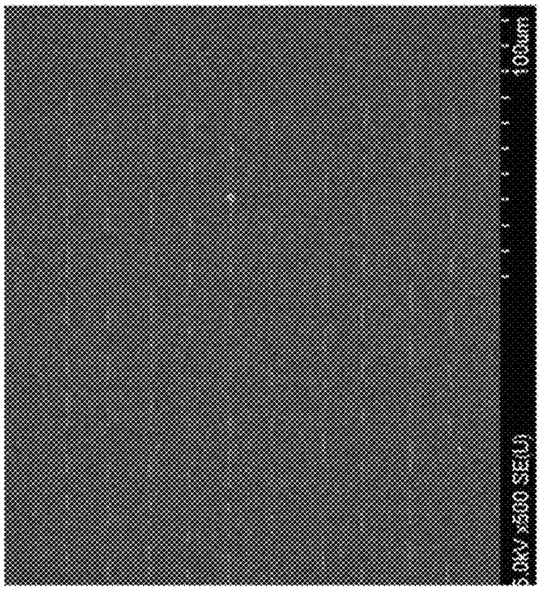
FIG. 8D depicts an output SEM image of nanowires written in parallel.
Figure 8E:
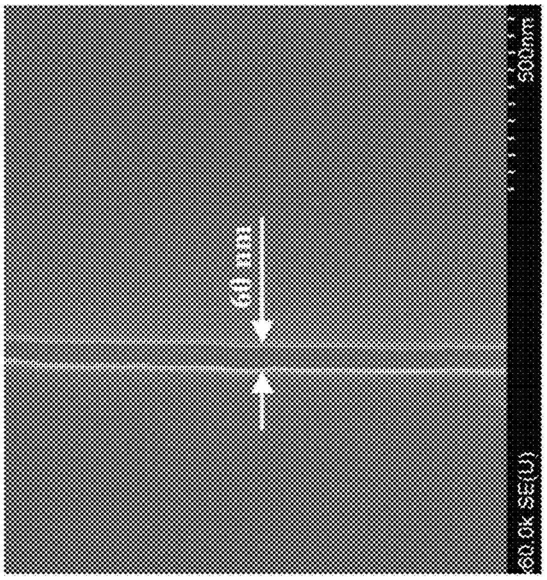
FIG. 8E depicts an output SEM image of zone plate lithography at 60 nm linewidth, using a 400 nm light source, showing a scale bar of 500 nm.
Figure 8F:
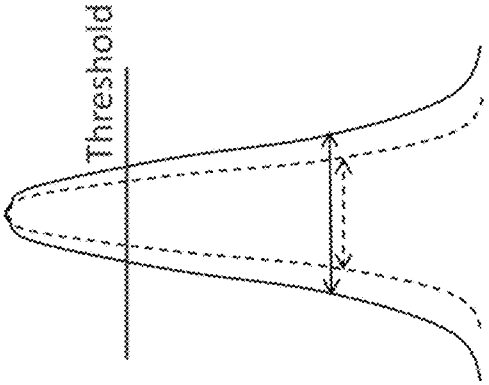
FIG. 8F depicts a graphical representation showing the narrowing of the spatial beam distribution due to two-photon absorption (dashed line) and the improving resolution with the use of a near-threshold dose when the laser intensity is slightly above the threshold of polymerization (solid line)

The described design is inherently ready for being brought to larger throughput scales. Fresnel zone plates are concentric rings with modified indices of refraction (phase zone plate) or alternating transmitting and opaque rings (amplitude zone plate), which diffract incoming light to a focal point, as shown in FIG. 8A. Zone plates are functional for almost any wavelength of light thus provide a direct path to the wavelengths needed in the proposed 3D nano-printing. Micro-fabrication methods (i.e., electron beam lithography) have also been used to make both phase and amplitude zone plates of the size of about 200-300 μm in diameter. FIG. 8B shows phase zone plates that have a numerical aperture (NA) greater than 0.95 in air, to produce ~200 nm-diameter spots using 400 nm wavelength light. These zone plates may be used in a light-guided nanowire CVD growth process and demonstrated the growth of nanowires of about 60 nm in diameter based on the effect of the light-induced interference within the zone plate focused region, as shown in FIG. 8C. Moreover, these zone-plates can be fabricated in an array, and manufactured ~100 nanowires in parallel, as shown in FIG. 8D. In nanolithography applications, these zone plates and 400 nm light have achieved a 60 nm linewidth by using nonlinear material responses, as shown in FIG. 8E.

The resolution of the zone plate is approximately $\lambda/(2NA\times n)$ where $\lambda$ is wavelength in air/vacuum, NA is the numerical aperture of the zone plate in air/vacuum, and n is the index of refraction of the material between the zone plate and the focal point (photopolymer in this work). Therefore, the estimated resolution is ~140 nm, when using 405 nm light sources and NA=0.95, n=1.5. These resolutions are achieved without any resolution enhancement mechanisms. Hence, a fundamental resolution of about 100 nm can be started with, and it can then be determined whether other effects such as the near-threshold processing can further improve the resolution. In this manner, never-before-seen high-resolution 3D structures may be produced.

The preliminary designs shown above started with zone plates that employed a fast scalar Rayleigh-Sommerfeld diffraction integral method and a generic algorithm. For the described work, systematic and more accurate numerical simulations can be performed to determine the zone plate designs for maximizing zone plate efficiencies and resolution. The key to optimization, particularly when using a generic algorithm, is to improve the speed of each calculation. Available methods for fast computation are often limited to narrow angles around the optical axis. Recently an accurate Hankel-transform beam propagation method was developed for computing and optimizing complex zone plates (e.g., volume zone plates). This method can be implemented in this work, following the initial design using the diffraction integral, to achieve the final accurate design and optimization within a reasonable time frame.

Accordingly, the zone plate efficiency and the resolution can be maximized, which are important for 3D nano-printing. Considering the absorption of resin, the electromagnetic field output from the zone-plate calculations can be used to compute and optimize the laser intensity distribution iteratively. This type of calculation will be useful to optimize the resolution with a given type of resin.

ii. Two-Color Single-Photon 3D Nano-Printing

While a single-color single-photon process allows faster printing, a two-color two-step scheme may be utilized to further increase the printing resolution, enhance nonlinearity, and increase the throughput. For most 2D nanoscale devices, the functions and speeds increase quadratically as it is scaled with the feature size reduction. While 3D devices can benefit even more from scaling down lithography features.

Figure 9A:
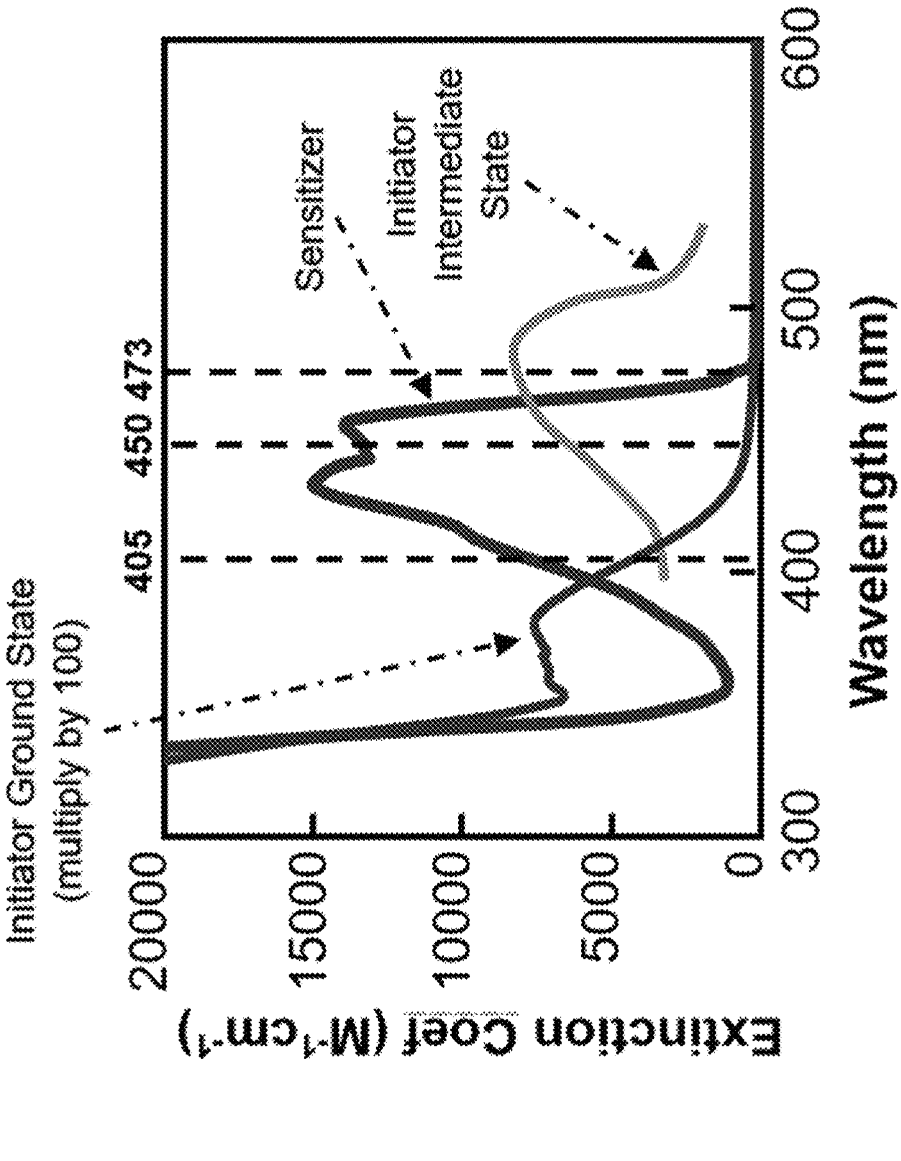
FIG. 9A depicts a graphical representation of a two-color TSA scheme, showing three wavelengths (405 nm, 450 nm, and 473 nm) each marked as examples to selectively excite the two absorption steps.
Figure 9B:
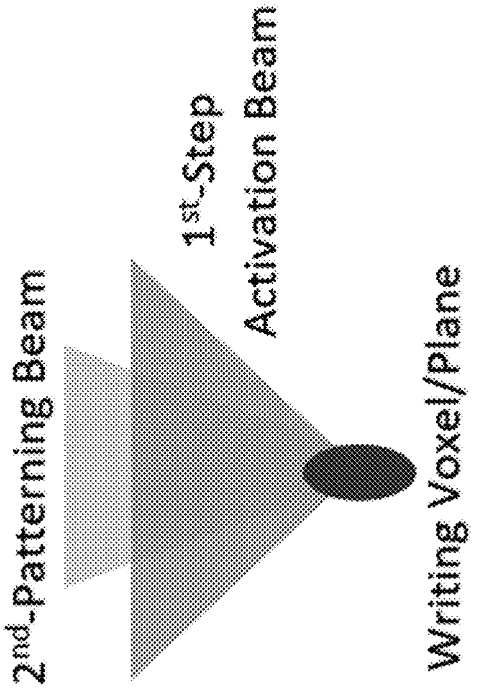
FIG. 9B depicts a schematic of a two-color TSA scheme, showing the patterning voxel/plane being determined by an overlap region of the two colors.

An improved two-color approach described herein can separately control the first activation step and the second patterning step using two distinct colors. One activation light can be used to excite the initiators to their intermediate state at an intensity slightly below the patterning threshold, while the other patterning light is simultaneously illuminated to trigger the photo-radical generation, therefore their overlapping region will define the writing voxel/plane. As shown in FIG. 9A, the combination of 450 nm and 473 nm can be chosen for the sensitized TSA scheme, and the combination of 405 nm and 450 nm for the TSA scheme without sensitizers.

The systems and methods described herein are fundamentally different from other single-photon two-color 3D printing approaches that were created to produce macroscopic parts at the sub-millimeter (~100-μm) resolution. Prior works also use a second color of light to optically define an activation/inhibition region to assist the 3D printing process. However, unlike using electronic transition of the molecules, prior works utilized the fragmentation and reconfiguration processes of photosensitive molecules that are irreversible or slowly reversible (i.e., will take ~10-100 seconds to recover, comparing to the us scale recovering time in the described system). The slow response of the materials and accumulation of byproducts will intrinsically limit their ultimate resolution and patterning uniformity, making their processes infeasible for nanoscale printing.

This two-color two-step scheme creates a more efficient nonlinear process by balancing the excitation and absorption rate of the two steps. For an energy-efficient second order process, the excitation rates for both steps need to be at a similar level. However, this is hard to achieve due to the limited choices of TSA initiators available. By using this two-color scheme, the relative intensities of the two lights can be tuned to achieve optimized power efficiency by regulating the excitation rates. The unbalanced absorption rates of the two steps have caused the second order response to gradually fade away as the laser intensity increases (e.g., over one mW for the single-color TSA process) likely due to the excitation-induced depletion of the intermediate-state molecules. With the two-color approach, this balanced energy efficiency can significantly promote the dynamic range of the process nonlinearity (i.e., maintain process nonlinearity at high laser powers), therefore, having the potential to outperform the highest demonstrated scanning speed (4000 μm/s). From the optics side, this two-color scheme also allows for relaying more optical power by simply using dichroic mirrors without worrying about the interference and beating between two similar light sources.

Figure 9C:
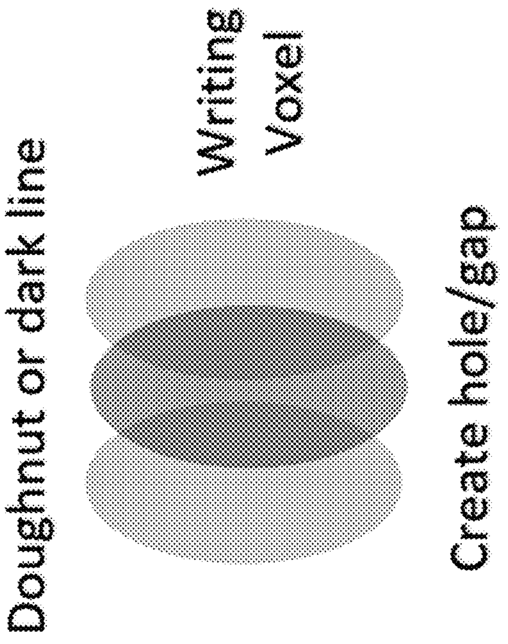
FIG. 9C depicts a schematic of a two-color TSA scheme, showing shape voxels used to trim the pattern.

This two-color scheme may be used to extend the capabilities of the demonstrated single-photon printing tool to fabricate elementary geometries (e.g., dots, lines, holes, and gaps) at a 50 nm resolution or better. Fabrication holes and gaps of sub-diffraction sizes can be achieved by changing the relative voxel position and shape of the two colors to selectively shape the voxel shapes. Several methods have been proposed to generate the intensity distribution with one or several narrow regions of zero intensity, such as the narrow line, doughnut, and box. By using the zero intensity to circumvent the Rayleigh criterion, holes and gaps can be fabricated at a resolution better than that of the diffraction limit of the optics, as shown in FIG. 9C.

In addition to the fine resolution advantage to pattern holes and gaps, this two-color scheme can also open the opportunities to write 50-nm dots and lines in 3D. For an ideal second order process, it is straightforward to show that the multiplication of two Gaussian intensity profiles (i.e., a 2nd order process with respect to light intensity) can reduce the beam width by $\sqrt{2}$ times. This is consistent with the fact reliable 3D writing has been demonstrated at a 100-nm linewidth using a ~140 nm focus size from a high-NA immersion objective lens. An even higher order of nonlinearity in the process is required to further enhance the resolution to 50 nm and better.

In the initiation-depletion-based patterning process, the order of nonlinearity increases as laser intensity decreases (see, FIG. 5B). This trend is caused by the inbound diffusion of inhibition species that can trim around the writing voxel. However, the equivalent intensity that provides a 50 nm resolution can only pattern at a speed of about 100 μm/s, which is limited by the diffusion speed of the inhibitor molecules. To achieve both high speed and high nonlinearity, one can integrate the initiation-depletion based and TSA based mechanisms and tune their relative strengths so that the depletion of initiator and inhibitors can occur near the surface and at the center of laser focus, respectively. This is guaranteed because the initiator is adjusted to be at a slightly higher amount than inhibitors. Under a sufficient laser intensity, the inhibitors can be totally consumed at the center of laser focus therefore polymerization can start. While a small distance away from the focus center, although the laser intensity is almost the same, the consumed inhibitors can be quickly refilled to prevent polymerization. By integrating two nonlinear mechanisms, inhibitors can now trim the laser focus twice at both activation and patterning steps of TSA to provide an even higher order of nonlinearity to further improve pattern resolution. This feature reduction mechanism has been confirmed in the initiation-depletion-based patterning process. The amount of voxel size reduction is determined by the diffusion distance of the inhibitors, which can be accurately tuned by the process parameters. With this enhanced process nonlinearity, one can dynamically control the voxel offset between these two colors by using active optical elements and study the effect of voxel size reduction with the aim to improve the pattern resolution. Current active optics, such as deformable lenses and steerable mirrors, can respond at a frequency of several kHz, which is sufficient for preliminary testing, although faster beam control methods at MHz frequencies are also commercially available. It is worth noting that this resolution improvement solution is also applicable to a projection process where millions of voxels are written simultaneously. More details about parallel projection printing are explained in the next section.

Additional resolution enhancement methods can be tested in this single-photon process by adding light-induced inhibition mechanisms, including the Stimulated Emission Depletion (STED) and photo-generated inhibitors. Another possible mechanism to enhance resolution is by quenching the excited initiators, such as the triplet state absorption. The TTET processes are also candidates to restore the excited initiators to their ground state by using quenching molecules with low triplet state energy levels (therefore the initiators can only lose rather than gain energy after the process), as well as other photo-induced quenching processes. Beyond the list discussed above, there are additional resolution improvement methods previously developed for a single-photon 2D patterning process that can be considered.

iii. Single-Photon Projection 3D Nano-Printing

Figure 10:
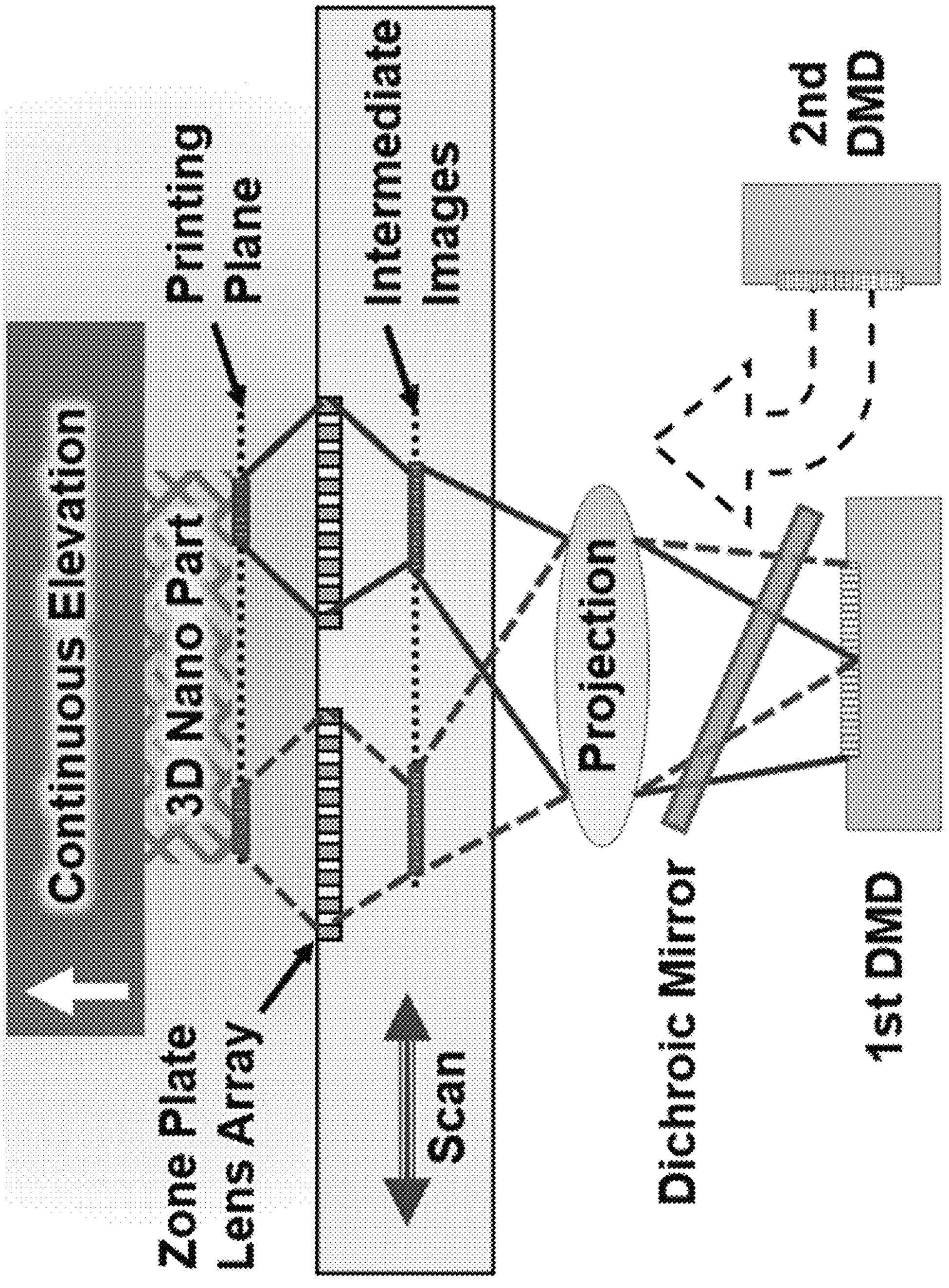
FIG. 10 depicts a schematic of one exemplary parallel projection 3D nano-printing system.

The DMD technology can be used together with the single-photon two-color nonlinear process to achieve the high-speed layer-by-layer projection nano-printing at a 50-nm resolution or better. One can use two DMDs to project the activation and patterning images respectively, as shown in FIG. 10. The image location of the patterning beam can be controlled by active optics to dynamically adjust its offset to the activation image. To print non-periodic 3D objects over a large area, one can divide the DMD into sub-areas where each of them directly provides an arbitrary pattern to a corresponding Fresnel zone plate lens in the array. The substrate carrying the Fresnel zone plate lens array can move laterally and continuously to cover the whole area, while the DMD patterns are synchronized with the motion of the lens array. There may be no need to perform the raster scan of a laser beam, therefore the timing control can be significantly simpler. To print periodic structures, the projection can be reconfigured by moving the intermediate images to infinity (i.e., in the infinity-corrected configuration), therefore all zone plate lenses can write identical structures at their focal plane.

Potentially when writing large geometries, a simultaneous crossover of multiple light rays may produce hotspots outside the desired patterning locations. To avoid this, the activation and patterning images can be decomposed into a subset of geometries (such as line groups) and the strong nonlinearity of the pattern formation process can be used to remove the unwanted hotspot exposures. This is feasible because of the fast intensity drop away from the writing plane for dot and line patterns. In the ideal situation of second order nonlinearity, considering the case of writing a dot voxel, the light intensity at one voxel away in the direction of the light path is about four times weaker than of the voxel location. In this case, the exposure time needs to be around 16 times higher to polymerize the voxel. In experiments, the required time was found to be even longer since there exists an inhibition period (similar to the Schwarzschild effect) that causes further delay in pattern formation in the low light condition. FIB. 5B shows an experimental example of such a situation, where four times less pulse intensity leads to about 100 times longer exposure time (10 nJ vs. 40 nJ pulses). In the presence of the new initiation-depletion nonlinear mechanism, pattern formation will eventually stop when the pulse energy drops to below 10 nJ, meaning that no patterns can form even if one keeps writing the same voxel after an unpractically long time.

Considering a 4K DMD chip with 3840×2160 pixels, a 16×9 array of Fresnel zone plate lens array (3.2 mm×1.8 mm in size) can be used, where each lens of 200 μm in diameter collects a sub-image of 240×240 pixels. Under a 10-× demagnified projection, a DMD pixel of 5.4 μm in size corresponds to a 54-nm size, which is well below the diffraction limit (about 140 nm) and can meet the needs.

The use of this parallel projection method can be demonstrated to non-periodic 3D geometries at the mm scale (e.g., 2 mm×2 mm). The demonstration of the patterning scheme can be completed by moving the lens array at relatively low scanning speeds. This proof-of-concept can be expected to achieve a 1000 times higher throughput than that of the single beam scan. In its future application, the patterning throughput can be greatly enhanced after more engineering efforts. Since the demonstrated pattern formation time is about 25 μs (corresponding to a 4000 μm/s writing speed in a scanning laser patterning for 100 nm voxels) which is at the same time scale as the highest DMD refresh speed (~32 kHz for legacy chips and 135 kHz for recent models), the ultimate patterning throughput for this method can reach over 3×1011 voxel/s (i.e., over 10 mm3/s for printing at a 50-nm/100-nm voxel width/height), which is about 107 times faster than that of the single beam scanning at the 4000 μm/s speed for writing arbitrary geometries. When printing periodic geometries using a large array of the Fresnel zone plate lenses, the achievable voxel throughput can be further enhanced by orders of magnitudes, only limited by the usable optical power and sensitivity of the photopolymer.

C. Digital-Twin Databases for Low Cost, High Throughput 3D Nano-Printing

A digital-twin database can be created that connects the printing parameters with the printed parts, hence, can be later used with ML algorithms to guide advanced cyber nanomanufacturing. The digital-twin database created can contribute to the important function of optical proximity correction (OPC), which is a photolithography enhancement technique used to compensate for image errors due to diffraction or process effects. When the printed feature size reaches the wavelength scale, the coherence of the illumination source starts to significantly impact the imaging quality, even for the incoherent source used in the conventional projection photolithography. The optical proximity effect causes distortions, such as narrower or wider linewidths, poor edge straightness, unwanted rounded corners, and missing gaps. Such distortions, if not corrected for, may lead to product defects and failures. In deep-UV photolithography, over 50% of the lithography costs for making computer chips are spent on OPC. This OPC process heavily relies on the experimental results because of the highly nonlinear nature of the pattern formation process in the resist layer. A large number of test patterns are fabricated and examined to create a database to guide the iterations of intense OPC computations of wide-field light diffraction.

Post-printing structure inspections can be used, such as scanning electron beam microscopy, to obtain geometry information and validate printing results. The obtained geometric information can be corrected with the printing parameters and surrounding conditions. Unlike conventional OPC where all patterns are simultaneously created in 2D, the 3D patterning in nano-printing is also affected by the sequence and speed of pattern placements, and all neighboring patterns in the 3D space. One can collect all of these parameters listed above and include more affecting parameters discovered in practice. One can also collect some of the structure properties (e.g., mechanical strength, optical properties, and chemical compositions) for the database, which can be later used with ML algorithms to predict final device functions in future cyber nanomanufacturing.

Reference systems that may be used herein can refer generally to various directions (for example, upper, lower, forward and rearward), which are merely offered to assist the reader in understanding the various embodiments of the disclosure and are not to be interpreted as limiting. Other reference systems may be used to describe various embodiments, such as those where directions are referenced to the portions of the device, for example, toward or away from a particular element, or in relations to the structure generally (for example, inwardly or outwardly).

While examples, one or more representative embodiments and specific forms of the disclosure have been illustrated and described in detail in the drawings and foregoing description, the same is to be considered as illustrative and not restrictive or limiting. The description of particular features in one embodiment does not imply that those particular features are necessarily limited to that one embodiment. Some or all of the features of one embodiment can be used in combination with some or all of the features of other embodiments as would be understood by one of ordinary skill in the art, whether or not explicitly described as such. One or more exemplary embodiments have been shown and described, and all changes and modifications that come within the spirit of the disclosure are desired to be protected.

We claim:

1. A method of additive manufacturing, comprising:

(a) exciting a photoinitiator molecule from a photoinitiator ground state to an excited photoinitiator singlet state;

(b) via an intersystem crossing procedure, transitioning the photoinitiator molecule from the photoinitiator singlet state to an excited photoinitiator triplet state;

(c) exciting a sensitizer molecule from a sensitizer ground state to an excited sensitizer singlet state;

(d) transitioning, via an intersystem crossing procedure, the sensitizer molecule from the sensitizer singlet state to an excited sensitizer triplet state;

(e) initiating a triplet-triplet energy transfer process to excite the photoinitiator molecule at the excited photoinitiator triplet state using energy from the sensitizer molecule at the excited sensitizer triplet state;

(f) upon initiating the triplet-triplet energy transfer process, exciting the photoinitiator molecule to thereby generate a free radical configured to initiate polymerization.

2. The method of claim 1, wherein exciting the photoinitiator molecule from the photoinitiator ground state to the excited photoinitiator singlet state and exciting the sensitizer molecule from the sensitizer ground state to the excited sensitizer singlet state includes directing a first photon beam onto the photoinitiator molecule and the sensitizer molecule.

3. The method of claim 2, wherein the first photon beam is a single-photon beam.

4. The method of claim 2, wherein the first photon beam is a continuous-wave diode laser beam.

5. The method of claim 1, wherein exciting the photoinitiator molecule to thereby generate the free radical includes directing a second photon beam onto the photoinitiator molecule.

6. The method of claim 5, wherein the second photon beam is a single-photon beam.

7. The method of claim 5, wherein the second photon beam is a continuous-wave diode laser beam.

8. The method of claim 1, wherein:

exciting the photoinitiator molecule from the photoinitiator ground state to the excited photoinitiator singlet state and exciting the sensitizer molecule from the sensitizer ground state to the excited sensitizer singlet state includes directing a first photon beam onto the photoinitiator molecule and the sensitizer molecule;

wherein exciting the photoinitiator molecule to thereby generate the free radical includes directing a second photon beam onto the photoinitiator molecule; and the first and second photon beams are different wavelengths.

9. The method of claim 8, wherein the wavelength of the second photon beam is greater than the wavelength of the first photon beam.

10. The method of claim 1, wherein exciting the photoinitiator molecule from the photoinitiator ground state to the excited photoinitiator singlet state includes directing a one-photon beam onto the photoinitiator molecule, wherein exciting the sensitizer molecule from the sensitizer ground state to the excited sensitizer singlet state includes directing a two-photon beam onto the photoinitiator molecule.

11. A method of additive manufacturing, comprising:

(a) exciting a photoinitiator molecule from a photoinitiator ground state to an excited photoinitiator singlet state;

(b) transitioning, via an intersystem crossing procedure, the photoinitiator molecule from the photoinitiator singlet state to an excited photoinitiator triplet state;

(c) exciting a sensitizer molecule from a sensitizer ground state to an excited sensitizer singlet state;

(d) transitioning, via an intersystem crossing procedure, the sensitizer molecule from the sensitizer singlet state to an excited sensitizer triplet state;

(e) initiating a triplet-triplet energy transfer process to excite the photoinitiator molecule at the excited photoinitiator triplet state using energy from the sensitizer molecule at the excited sensitizer triplet state;

(f) upon initiating the triplet-triplet energy transfer process, exciting the photoinitiator molecule to thereby generate a free radical configured to initiate polymerization; and (g) temporally modulating laser light to actively regulate the polymerization rate at the nanoscale.

12. The method of claim 11, wherein temporally modulating the laser light includes pulsing the laser at repetition rates of tens to hundreds of KHz.

13. The method of claim 11, wherein temporally modulating the laser light includes pulsing the laser at 2-5% duty cycles.

14. The method of claim 11, wherein each modulation cycle includes a first phase wherein the laser pulse generates radical species to overcome local inhibition without initiating polymerization, a second phase wherein local inhibitors are depleted and initiating radicals start local polymerization, and a third phase wherein the laser is off allowing inhibitors to diffuse into the printing volume before the next cycle starts.

15. The method of claim 11, wherein the method produces a three-dimensional nanostructure having a minimum feature size of about 100 nm.

16. A method of additive manufacturing, comprising:

(a) exciting a photoinitiator molecule from a photoinitiator ground state to an excited photoinitiator singlet state;

(b) transitioning, via an intersystem crossing procedure, the photoinitiator molecule from the photoinitiator singlet state to an excited photoinitiator triplet state;

(c) exciting a sensitizer molecule from a sensitizer ground state to an excited sensitizer singlet state;

(d) transitioning, via an intersystem crossing procedure, the sensitizer molecule from the sensitizer singlet state to an excited sensitizer triplet state;

(e) initiating a triplet-triplet energy transfer process to excite the photoinitiator molecule at the excited photoinitiator triplet state using energy from the sensitizer molecule at the excited sensitizer triplet state;

(f) upon initiating the triplet-triplet energy transfer process, exciting the photoinitiator molecule to thereby generate a free radical configured to initiate polymerization; and (g) controlling depletion of photoinitiation species in an environment containing inhibiting species to create a confined writing voxel in 3D space.

17. The method of claim 16, wherein the method further comprises enabling diffusion of inhibiting radicals to reduce the printed volume to achieve high printing resolution.

18. The method of claim 16, further comprising depleting inhibiting radicals at the location where printing is needed by proper laser power control.

19. The method of claim 16, wherein diacetyl is used as the sensitizer.

20. The method of claim 16, wherein the method is performed at a scanning speed of about 4000 μm/s.

* * * * *